United States Patent
Dohi et al.

(10) Patent No.: US 12,117,051 B2
(45) Date of Patent: Oct. 15, 2024

(54) REVERSE-INPUT BLOCKING CLUTCH

(71) Applicant: NSK Ltd., Tokyo (JP)

(72) Inventors: Nagao Dohi, Fujisawa (JP); Yuya Daikoku, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/266,654

(22) PCT Filed: Jan. 28, 2022

(86) PCT No.: PCT/JP2022/003413
§ 371 (c)(1),
(2) Date: Jun. 12, 2023

(87) PCT Pub. No.: WO2022/168764
PCT Pub. Date: Aug. 11, 2022

(65) Prior Publication Data
US 2024/0044377 A1 Feb. 8, 2024

(30) Foreign Application Priority Data

Feb. 8, 2021 (JP) ................................ 2021-018307
Dec. 17, 2021 (WO) .................. PCT/JP2021/046770

(51) Int. Cl.
*F16D 41/10* (2006.01)
*F16D 43/21* (2006.01)
*F16D 67/02* (2006.01)

(52) U.S. Cl.
CPC ............. *F16D 41/10* (2013.01); *F16D 43/21* (2013.01); *F16D 67/02* (2013.01)

(58) Field of Classification Search
CPC ...... F16D 41/10; F16D 41/082; F16D 43/211; F16D 51/12
See application file for complete search history.

(56) References Cited

U.S. PATENT DOCUMENTS

| 3,051,282 A | 8/1962 | Greene |
| 4,591,029 A | 5/1986 | Da Foe |
| 11,708,870 B2* | 7/2023 | Dohi ....................... F16D 51/22 |
| | | 192/37 |

FOREIGN PATENT DOCUMENTS

| EP | 4 123 192 A1 | 1/2023 |
| JP | 2006-138418 A | 6/2006 |

(Continued)

OTHER PUBLICATIONS

International Search Report for PCT/JP2022/003413 dated Apr. 12, 2022.

(Continued)

*Primary Examiner* — Huan Le
(74) *Attorney, Agent, or Firm* — Sughrue Mion, PLLC

(57) ABSTRACT

A reverse-input blocking clutch, comprising a pressed member, an input member, an output member, and an engaging element, the pressed member including a first pressed member element having a pressed surface around an inner peripheral surface thereof and a second pressed member element having a mounting portion fixed to a portion that does not rotate during use, the engaging element configured to transmit rotational torque input to the input member to the output member by moving in a direction away from the pressed surface and to completely block rotational torque reversely input to the output member or transmit a part of the rotational torque reversely input to the output member to the input member and block a remaining part thereof.

8 Claims, 23 Drawing Sheets

(56) References Cited

FOREIGN PATENT DOCUMENTS

| | | |
|---|---|---|
| JP | 2007-040343 A | 2/2007 |
| JP | 2009-063017 A | 3/2009 |
| JP | 2019-203530 A | 11/2019 |
| WO | 2006/117343 A1 | 11/2006 |
| WO | 2020/054763 A1 | 3/2020 |

OTHER PUBLICATIONS

Supplementary European Search Report issued Jun. 13, 2024 in European Application No. 22749636.1.

* cited by examiner

REVERSE-INPUT BLOCKING CLUTCH

CROSS REFERENCE TO RELATED APPLICATIONS

This application is a National Stage of International Application No. PCT/JP2022/003413 filed Jan. 28, 2022, claiming priority based on Japanese Patent Application No. 2021-018307 filed Feb. 8, 2021 and International Patent Application No. PCT/JP2021/046770 filed Dec. 17, 2021.

TECHNICAL FIELD

The present invention relates to a reverse-input blocking clutch that transmits rotational torque input to an input member to an output member, while completely blocking rotational torque reversely input to the output member so as not to transmit it to the input member, or transmitting only a part of it to the input member and blocking the remaining part.

BACKGROUND ART

FIGS. 21 to 23 illustrate an example of a conventional construction of an electric motor with a reverse-input blocking clutch described in WO2020/054763. The electric motor with the reverse-input blocking clutch 100 includes a reverse-input blocking clutch 102 in the middle of an output shaft 101. That is, the output shaft 101 is configured by connecting a first shaft 103 and a second shaft 104 coaxially arranged with each other by the reverse-input blocking clutch 102.

The first shaft 103 is rotatably supported inside a motor housing 105. A rotor 106 is fitted and fixed around an intermediate portion in the axial direction of the first shaft 103, and a stator 107 supported and fixed to the motor housing 105 is arranged around the rotor 106. When the stator 107 is energized and a rotational force is applied to the rotor 106, the first shaft 103 rotates.

The second shaft 104 is rotatably supported with respect to a clutch housing 108 of the reverse-input blocking clutch 102.

The reverse-input blocking clutch 102 includes an input portion 109, an output portion 110, the clutch housing 108, and a pair of engaging elements 111. In the following description, regarding the reverse-input blocking clutch 102, one side in the axial direction is the right side in FIG. 21, and the other side in the axial direction is the left side in FIG. 21.

The input portion 109 is provided at an end portion on the other side in the axial direction (left side in FIG. 21) of the first shaft 103. The input portion 109 has an input shaft portion 112 and a pair of input-side engaging portions 113. The input shaft portion 112 has a stepped columnar shape. The pair of input-side engaging portions 113 is configured by convex portions that extend in the axial direction from two locations on opposite sides in the radial direction of a tip-end surface of the input shaft portion 112.

The output portion 110 is provided at an end portion on the one side in the axial direction (right side in FIG. 21) of the second shaft 104. The output portion 110 has an output-side engaging portion 114. The output-side engaging portion 114 has a substantially elliptical columnar shape and is arranged between the pair of input-side engaging portions 113.

The clutch housing 108 has a stepped cylindrical shape. That is, the clutch housing 108 includes a small-diameter cylindrical portion 115 on the other side in the axial direction, a large-diameter cylindrical portion 116 on the one side in the axial direction, and a side plate portion 117 that connects the small-diameter cylindrical portion 115 and the large-diameter cylindrical portion 116. The clutch housing 108 has a pressed surface 118 on an inner peripheral surface of a portion on the other side in the axial direction of the large-diameter cylindrical portion 116. In other words, the clutch housing 108 corresponds to a pressed member.

Further, the clutch housing 108 has protruding portions 119 protruding toward outside in the radial direction from a plurality of locations in the circumferential direction of an outer peripheral surface of the large-diameter cylindrical portion 116 and screw holes 120 penetrating the protruding portions 119 in the axial direction.

The clutch housing 108 is connected and fixed to the motor housing 105 by externally fitting an end portion on the one side in the axial direction of the large-diameter cylindrical portion 116 to an annular protrusion 121 provided at an end portion on the other side in the axial direction of the motor housing 105 without looseness, and by screwing bolts inserted into through holes 122 provided in the motor housing 105 to the screw holes 120. The motor housing 105 is supported and fixed to a stationary portion that does not rotate during use.

Each engaging element 111 has a substantially semicircular plate shape and is arranged on the inside in the radial direction of the large-diameter cylindrical portion 116 of the clutch housing 108. The engaging element 111 has a pressing surface 123 configured by a partially cylindrical convex surface on an outside surface in the radial direction facing the pressed surface 118 and a bottom surface 125 configured by a flat surface except for a portion provided with an output-side engaged portion 124, which will be described later, on an inside surface in the radial direction. The radius of curvature of the pressing surface 123 is equal to or less than the radius of curvature of the pressed surface 118. The radial direction with respect to the engaging element 111 corresponds to a direction orthogonal to the bottom surface 125 indicated by an arrow in FIG. 22, and the width direction with respect to the engaging element 111 is a direction parallel to the bottom surface 125 indicated by an arrow 8 in FIG. 22.

With the pair of engaging elements 111 arranged on the inner side in the radial direction of the large-diameter cylindrical portion 116, the inner-diameter dimension of the large-diameter cylindrical portion 116 and the dimension in the radial direction of the engaging elements 111 are regulated so that a gap exists in at least one of a portion between the pressed surface 118 and the pressing surface 123 and a portion between the bottom surfaces 125 of the pair of engaging elements 111.

The engaging element 111 has an input-side engaged portion 126 and the output-side engaged portion 124. The input-side engaged portion 126 is configured by a hole that penetrates in the axial direction through a central portion in the radial direction of the engaging element 111, and has a size such that the input-side engaging portion 113 may be loosely inserted therein. Therefore, the input-side engaging portion 113 is able to displace in a direction of rotation of the input portion 109 with respect to the engaging element 111, and the engaging element 111 is able to displace in the radial direction of the engaging element 111 with respect to the input-side engaging portion 113. The output-side engaged portion 124 is configured by a rectangular concave portion that is recessed outward in the radial direction from a central portion in the width direction of the bottom surface 125 of the engaging element 111, and has a size such that a front-half portion in a minor axis direction of the output-side engaging portion 114 can be arranged therein.

In the assembled state of the reverse-input blocking clutch 102, the pair of input-side engaging portions 113 of the input portion 109 is inserted from the other side in the axial direction into the input-side engaged portions 126 of the pair of engaging elements 111, and the output-side engaging portion 114 of the output portion 110 is inserted from the one side in the axial direction between the pair of output-side engaged portions 124. In other words, the pair of engaging elements 111 is arranged so as to sandwich the output-side engaging portion 114 from the outside in the radial direction.

When a rotational torque is input to the first shaft 103 by energizing the stator 107 and the input portion 109 rotates, as illustrated in FIG. 22, the input-side engaging portions 113 rotate in the direction of rotation of the input portion 109 inside the input-side engaged portions 126. Then, inside surfaces in the radial direction of the input-side engaging portions 113 press the inner surfaces of the input-side engaged portions 126 toward inside in the radial direction, which causes the engaging elements 111 move in directions away from the pressed surface 118, in other words, toward inside in the radial direction. Due to this, the pair of output-side engaged portions 124 hold the output-side engaging portion 114 of the output portion 110 from both sides in the radial direction, and the output-side engaging portion 114 and the pair of output-side engaged portions 124 engage without looseness. As a result, the rotational torque input to the first shaft 103 is transmitted to the output portion 110 through the pair of engaging elements 111 and is output from the second shaft 104.

On the other hand, when a rotational torque is reversely input to the second shaft 104 and the output portion 110 rotates, as illustrated in FIG. 23, the output-side engaging portion 114 rotates in the direction of rotation of the output portion 110 inside the pair of output-side engaged portions 124. Then, corner portions of the output-side engaging portion 114 press the bottom surfaces of the output-side engaged portions 124 toward outside in the radial direction, which causes the engaging elements 111 move in directions closer to the pressed surface 118, in other words, toward outside in the radial direction. Due to this, the pressing surfaces 123 of the engaging elements 111 are pressed against the pressed surface 118 of the clutch housing 108. As a result, the rotational torque reversely input to the second shaft 104 is completely blocked by being transmitted to the clutch housing 108 and is not transmitted to the first shaft 103, alternatively, only a part of the rotational torque reversely input to the second shaft 104 is transmitted to the first shaft 103 and the remaining part is blocked.

In order to completely block the rotational torque reversely input to the second shaft 104 so as not to be transmitted to the first shaft 103, the output portion 110 is locked by strongly holding the engaging elements 111 between the output-side engaging portion 114 of the output portion 110 and the pressed surface 118 of the clutch housing 108 so that the pressing surfaces 123 do not slide with respect to the pressed surface 118. In order to transmit only a part of the rotational torque reversely input to the second shaft 104 to the first shaft 103 and block the remaining part, the output portion 110 is semi-locked by holding the engaging elements 111 between the output-side engaging portion 114 and the pressed surface 118 so that the pressing surfaces 123 slide with respect to the pressed surface 118.

CITATION LIST

Patent Literature

Patent Literature 1: WO2020/054763
Patent Literature 2: WO2006/117343
Patent Literature 3: JP2007-040343A

SUMMARY OF INVENTION

Technical Problem

In the electric motor with the reverse-input blocking clutch 100 described in WO2020/054763, the clutch housing 108 having the pressed surface 118 is directly connected and fixed to the motor housing 105. Specifically, the clutch housing 108 is connected and fixed to the motor housing 105 by screwing the bolts inserted through the through holes 122 provided in the motor housing 105 into the screw holes 120 provided in the protruding portions 119 of the clutch housing 108.

When the clutch housing 108 is connected and fixed to the motor housing 105 by bolts, deformation may occur in the large-diameter cylindrical portion 116 of the clutch housing 108, and the roundness of the pressed surface 118 provided on the inner peripheral surface of the large-diameter cylindrical portion 116 may decrease. If the roundness of the pressed surface 118 decreases, the time required for the pressing surfaces 123 of the engaging elements 111 to come into contact with the pressed surface 118 when a rotational torque is reversely input to the second shaft 104 may vary depends on the phase of the engaging elements 111 with respect to the pressed surface 118 in the circumferential direction. That is, variation may occur in the time required to switch the reverse-input blocking clutch 102 from the unlocked state to the locked state or semi-locked. As a result, the controllability of the electric motor with the reverse-input blocking clutch 100 may deteriorate, and the locking performance of switching the reverse-input blocking clutch 102 from the unlocked state to the locked state or the semi-locked state may deteriorate.

WO2006/117343 and JP2007-040343A describe a reverse-input blocking clutch which prevents rotation of an output member by moving engaging elements (rolling bodies) arranged in a space between an inner member and the outer member toward the side having a narrower width in the radial direction of the space and holding the engaging elements strongly between the inner member and the outer member when a rotational torque is reversely input to the output member.

In the reverse-input blocking clutch described in WO2006/117343 and JP2007-040343A as well, when the outer member is directly connected and fixed to a portion that does not rotate during use, the roundness of a pressed surface that is provide on an inner peripheral surface of the outer member and that contacts the engaging elements may deteriorate, resulting in deterioration of controllability and locking performance.

An object of the present invention is to provide a reverse-input blocking clutch capable of preventing deterioration of the roundness of the pressed surface.

Solution to Problem

A reverse-input blocking clutch of one aspect of the present invention includes a pressed member, an input member, an output member, and an engaging element.

The pressed member includes a first pressed member element having a pressed surface around an inner peripheral surface thereof and a second pressed member element having a mounting portion fixed to a portion that does not rotate during use.

The input member is rotatably supported with respect to one of the first pressed member element and the second pressed member element.

The output member is coaxially arranged with the input member, and is rotatably supported with respect to the other of the first pressed member element and the second pressed member element.

The engaging element moves in a direction away from the pressed surface based on engagement with the input member and engages with the output member when rotational torque is input to the input member so as to transmit the rotational torque input to the input member to the output member. Further, the engaging element moves in a direction toward the pressed surface based on engagement with the output member when rotational torque is reversely input to the output member so as to come into contact with the pressed surface, completely blocking the rotational torque reversely input to the output member or transmitting a part of the rotational torque reversely input to the output member to the input member and blocking a remaining part thereof.

In the reverse-input blocking clutch of one aspect of the present invention, the first pressed member element may have an inner-diameter-side fitting surface on an outer peripheral surface thereof, and the second pressed member element may have an outer-diameter-side fitting surface on an inner peripheral surface thereof which is externally fitted to the inner-diameter-side fitting surface without looseness in a radial direction.

In the reverse-input blocking clutch of one aspect of the present invention, the second pressed member element may have a tubular portion having the outer-diameter-side fitting surface on the inner peripheral surface thereof, and the mounting portion may have a protruding portion protruding from the tubular portion outward in the radial direction and a mounting hole penetrating the protruding portion in an axial direction through which a bolt is inserted.

In the reverse-input blocking clutch of one aspect of the present invention, the input member may be rotatably supported with respect to the second pressed member element, and the output member may be rotatably supported with respect to the first pressed member element.

Alternatively, the input member may be rotatably supported with respect to the first pressed member element, and the output member may be rotatably supported with respect to the second pressed member element.

In the reverse-input blocking clutch of one aspect of the present invention, the input member may have an input-side engaging portion in a portion deviated in a radial direction from a center of rotation of the input member, and the output member may have an output-side engaging portion on an inner side in the radial direction from the input-side engaging portion, and the engaging element may have a pressing surface on an outside surface in the radial direction facing the pressed surface, an output-side engaged portion on an inside surface in the radial direction that engages with the output-side engaging portion, and an input-side engaged portion in an intermediate portion in the radial direction that engages with the input-side engaging portion.

The reverse-input blocking clutch of one aspect of the present invention may have an elastic member elastically held between the output-side engaging portion and the engaging element. The elastic member presses the output-side engaging portion toward a side farther from the pressed surface in a first direction as a direction of the pressing surface moving away from or toward the pressed surface, and presses the engaging element toward a side closer to the pressed surface in the first direction.

In the reverse-input blocking clutch of one aspect of the present invention, the engaging element may be configured by a pair of engaging elements arranged so as to hold the output-side engaging portion from both sides in the radial direction, and the input-side engaging portion may be configured by a pair of input-side engaging portions.

In the reverse-input blocking clutch of one aspect of the present invention, a reinforcing member spanning between tip end portions of the pair of input-side engaging portions may be provided.

Advantageous Effect of Invention

With the reverse-input blocking clutch of one aspect of the present invention, it is possible to prevent the roundness of the pressed surface from deteriorating.

BRIEF DESCRIPTION OF DRAWINGS

FIG. 13(A) is a plan view, FIG. 13(B) is a front view as viewed from underneath in FIG. 13(A), and FIG. 13(C) is a perspective view.

DESCRIPTION OF EMBODIMENTS

First Example

Figure 1:
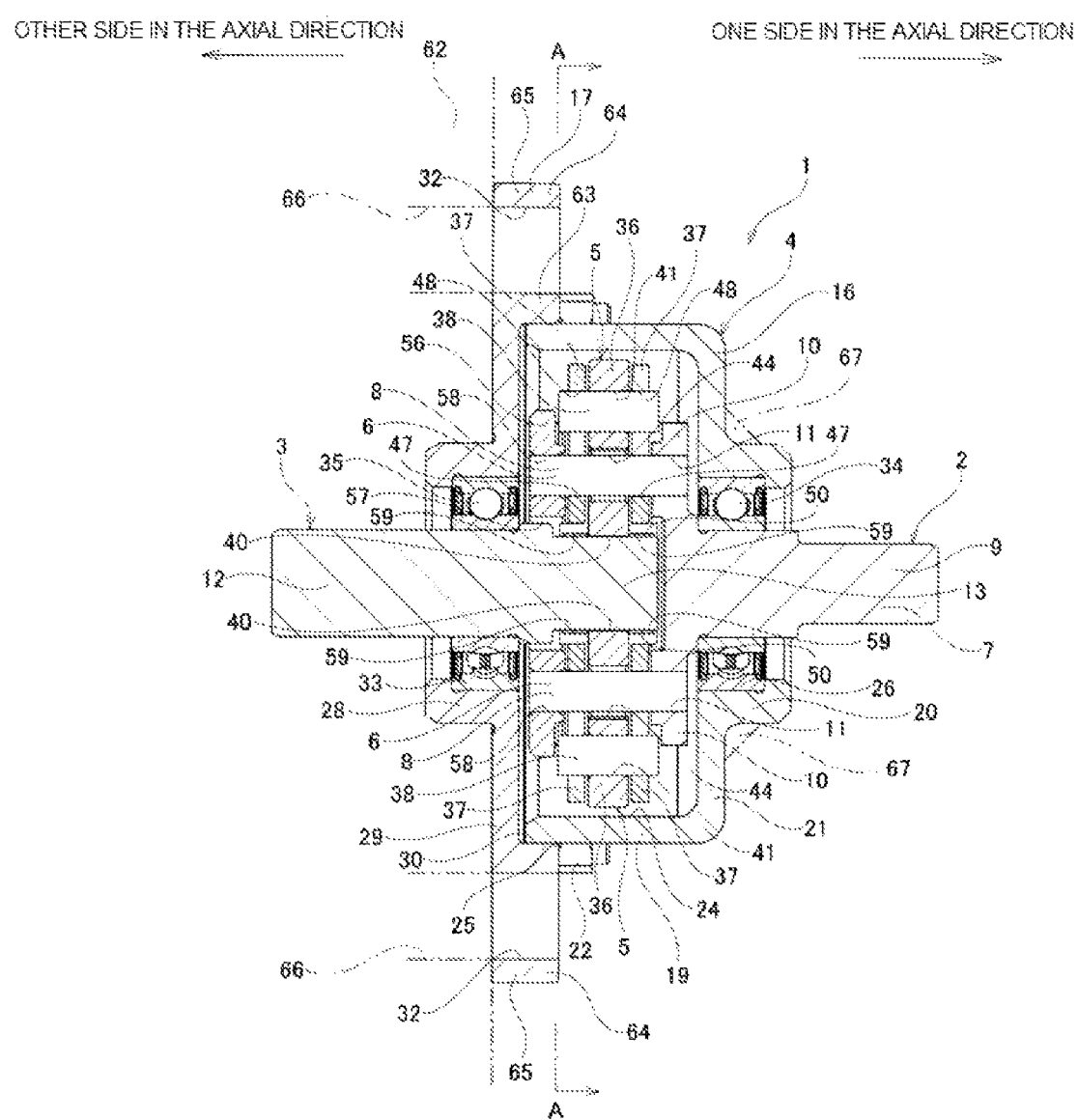
FIG. 1 is a cross-sectional view of a reverse-input blocking clutch of a first example of an embodiment of the present invention.

A first example of an embodiment of the present invention will be described using FIGS. 1 to 16.

In the description below, the axial direction, the radial direction, and the circumferential direction refer to, unless stated otherwise, the axial direction, the radial direction, and the circumferential direction of a reverse-input blocking clutch 1, more specifically, of a pressed surface of the pressed member of the reverse-input blocking clutch 1 (a pressed surface 24 of a housing 4). In this example, the axial direction, the radial direction, and the circumferential direction of the reverse-input blocking clutch 1 coincide with the axial direction, the radial direction, and the circumferential direction of an input member 2 and the axial direction, the radial direction, and the circumferential direction of an output member 3. Regarding the reverse-input blocking clutch 1, one side in the axial direction is the right side in FIGS. 1, 3, 7, 8, 9, and 10, and the other side in the axial direction is the left side in FIGS. 1, 3, 7, 8, 9, and 10.

The reverse-input blocking clutch 1 of this example includes the input member 2, the output member 3, the housing 4 which is the pressed member, and a pair of engaging elements 5 as an engaging element. The reverse-input blocking clutch 1 transmits rotational torque input to the input member 2 to the output member 3, but has a reverse input blocking function that does not transmit rotational torque reversely input to the output member 3, alternatively, transmits only a part of the rotational torque and blocks a remaining part thereof.

Figure 3:
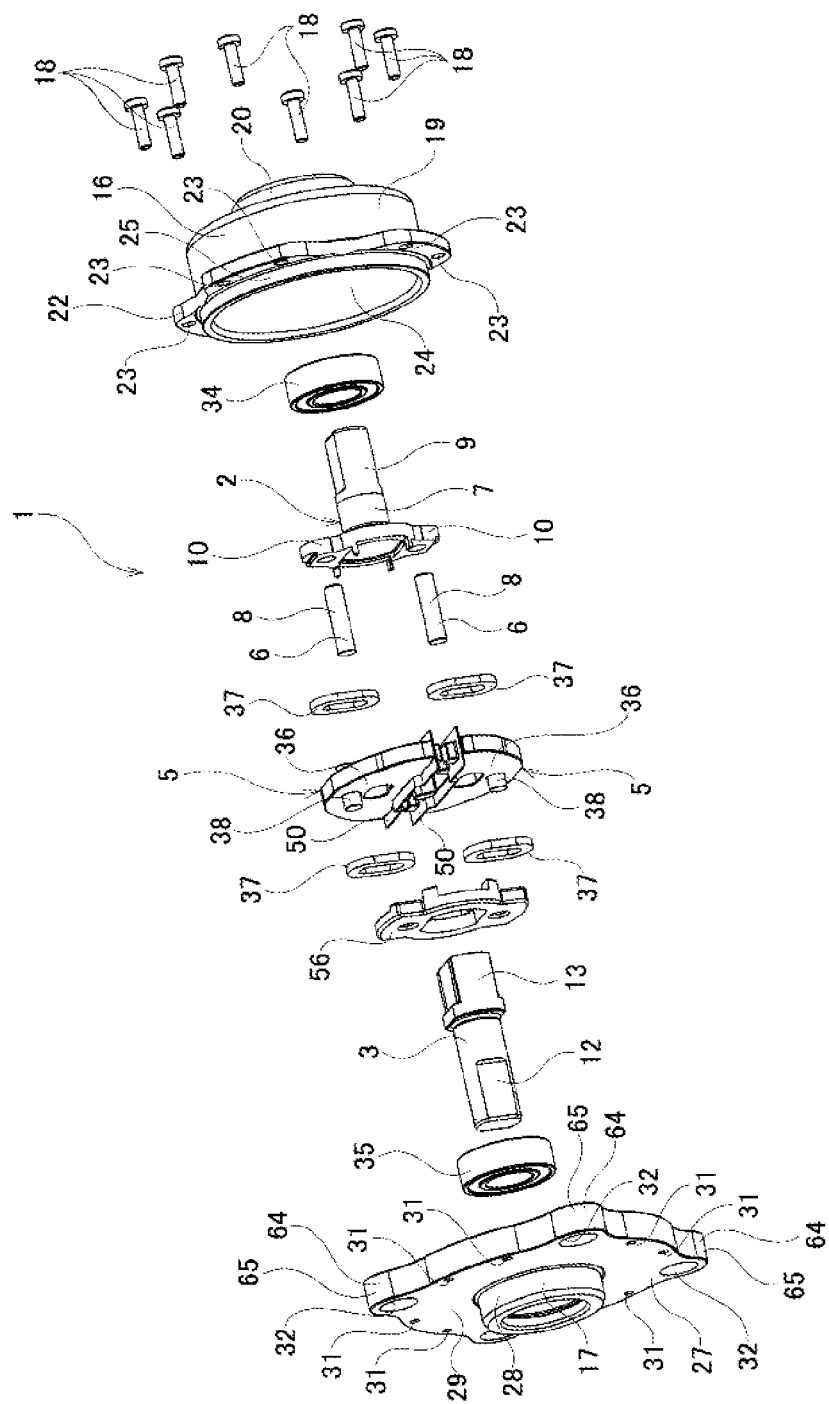
FIG. 3 is an exploded perspective view of the reverse-input blocking clutch of the first example.
Figure 8:
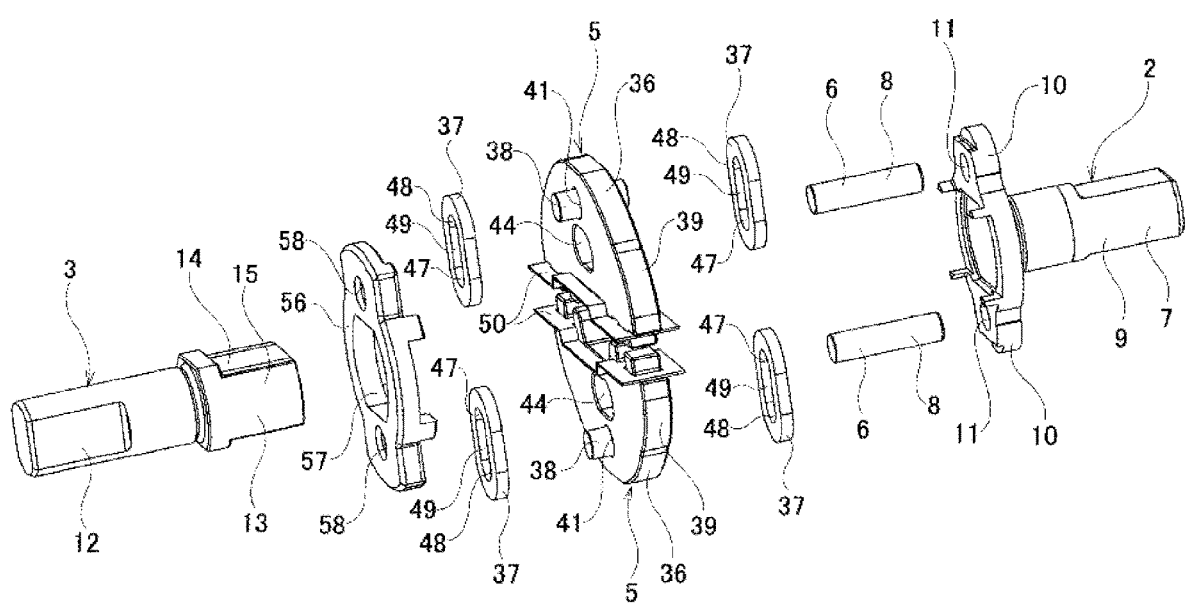
FIG. 8 is an exploded perspective view of the reverse-input blocking clutch of the first example with the housing, the input-side bearing, and the output-side bearing removed.

The input member 2 is connected to an input-side mechanism such as an electric motor, and receives rotational torque. The input member 2 of this example has a pair of input-side engaging portions 6 as an input-side engaging portion. In a case of implementing the present invention, the input member 2 can be configured by combining a plurality of parts, or can be integrally configured as a whole, that is, by one part. In this example, the input member 2 is configured by combining a shaft member 7 and a pair of input-side engaging pins 8, as illustrated in FIGS. 1, 3, and 8.

The shaft member 7 has an input shaft portion 9 and a pair of input arm portions 10.

The input shaft portion 9 is configured in a substantially cylindrical shape, and an end portion on the one side in the axial direction thereof is connected to an output portion of the input-side mechanism.

The pair of input arm portions 10 extend from an end portion on the other side in the axial direction of the input shaft portion 9 toward opposite sides in the radial direction. Each input arm portion 10 of the pair of input arm portions 10 has a support hole 11, which is an axial through hole, at the intermediate portion in the radial direction.

Each input-side engaging pin 8 of the pair of input-side engaging pins 8 is configured by a cylindrical pin. An end portion on the one side in the axial direction of the input-side engaging pin 8 is pressure fitted and fixed inside the support hole 11 of the input arm portion 10. In this example, the input-side engaging portion 6 is configured by the intermediate portion in the axial direction and an end portion on the other side in the axial direction of the input-side engaging pin 8.

In this example, the input arm portion and the input-side engaging portion are configured by the pair of input arm portions 10 and the pair of input-side engaging portions 6 according to the number of engaging elements to be described later, that is, according to the fact that the engaging element is configured by the pair of engaging elements 5. However, in a case of implementing the present invention, the number of the input arm portion and the input-side engaging portion are not limited to two, and it can also be set to one, or three or more, depending on the number of the engaging element.

Figure 4:
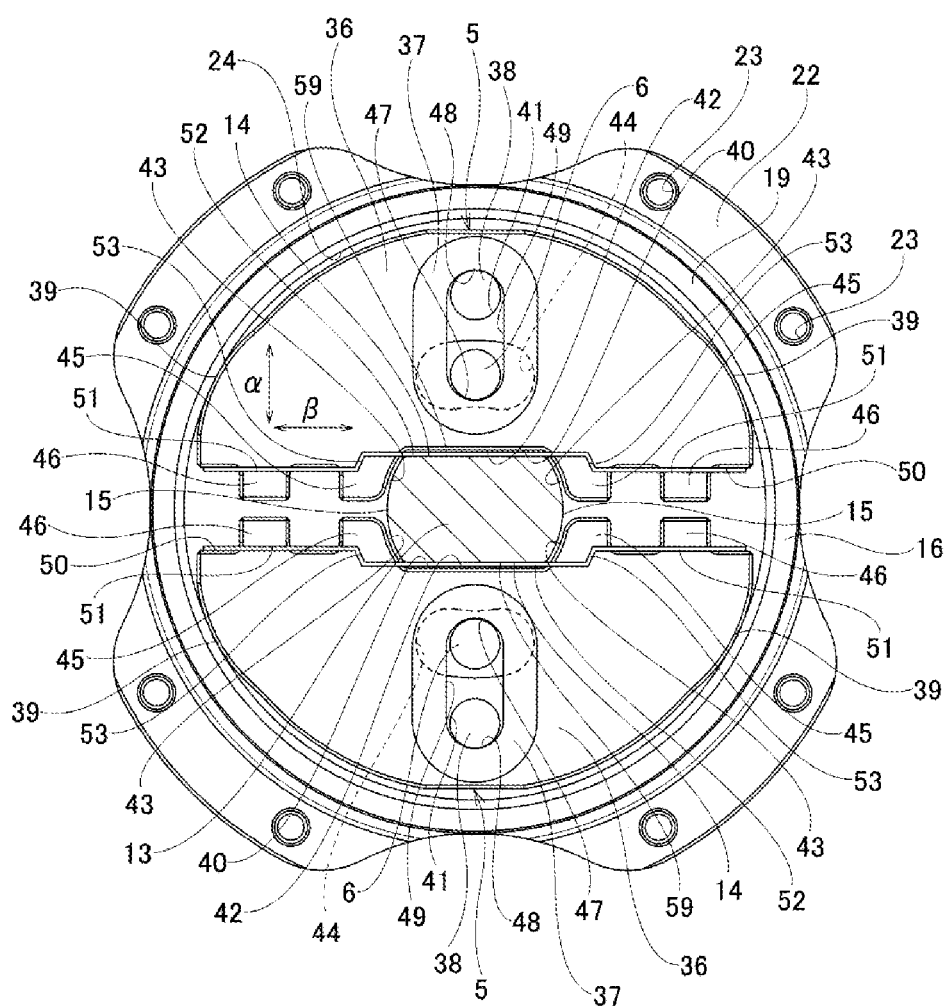
FIG. 4 is a view of the reverse-input blocking clutch of the first example with some parts omitted, with the output-side engaging portion cut along A-A in FIG. 1, in a neutral state where no rotational torque is input to either the input member or the output member.

The output member 3 is connected to an output-side mechanism such as a speed-reducing mechanism, and outputs rotational torque. The output member 3 is arranged coaxially with the input member 2, and has an output-shaft portion 12 and an output-side engaging portion 13 as illustrated in FIGS. 3 and 4. In a case of implementing the present invention, the output member 3 can be configured by combining a plurality of parts, or can be integrally configured as a whole, that is, by one part. In this example, the output member 3 is configured by one part.

The output-shaft portion 12 is configured in a substantially cylindrical shape, and an end portion on the other side in the axial direction thereof is connected to an input portion of the output-side mechanism.

The output-side engaging portion 13 has a substantially elliptical columnar shape, and extends from the central portion of an end surface on the one side in the axial direction of the output-shaft portion 12 to the one side in the axial direction. The outer peripheral surface of the output-side engaging portion 13, as illustrated in FIGS. 4 to 6, 16(A), and 16(B), has side surfaces 14 on both sides in the minor axis direction (vertical direction in FIGS. 4 to 6, 16(A), and 16(B)), and guide surfaces 15 configured by side surfaces on both sides in the major axis direction (horizontal direction in FIGS. 4 to 6, FIG. 16(A), and FIG. 16(B)). The guide surfaces 15 are arranged on both sides of the side surfaces 14, and in this example, the guide surfaces 15 of the side surfaces 14 on both sides are continuous in the minor axis direction and are each configured by one curved surface.

Each side surface 14 is a flat surface orthogonal to the minor axis direction of the output-side engaging portion 13. Each guide surface 15 is a convex curved surface. Specifically, each of the guide surfaces 15 is configured by a partially cylindrical convex surface that is centered on the center axis of the output-side engaging portion 13 (center axis of the output member 3). Therefore, regarding the output member 3, the outer peripheral surface of a round bar material, for example, can be used for the guide surfaces 15, and the processing cost can be suppressed accordingly. However, in a case of implementing the present invention, each of the guide surfaces may be a partially cylindrical convex surface centered on an axis parallel to the center axis of the output member 3, or may be non-cylindrical shaped convex surface such as partially elliptical shaped convex surface or the like. The output-side engaging portion 13 is arranged further on the inner side in the radial direction than the pair of input-side engaging portions 6, and more specifically, is arranged in a portion between the pair of input-side engaging portions 6.

In this example, according to the number of engaging element described later, in other words, according to the fact that the engaging element is configured by the pair of engaging elements 5, the side surface and the guide surfaces arranged on both sides thereof are configured by a pair of side surfaces 14 and guide surfaces 15 on both sides of each side surface 14. However, in a case of implementing the present invention, the number of the side surface is not limited to two, and it can also be set to one, or three or more, depending on the number of the engaging element.

Figure 2:
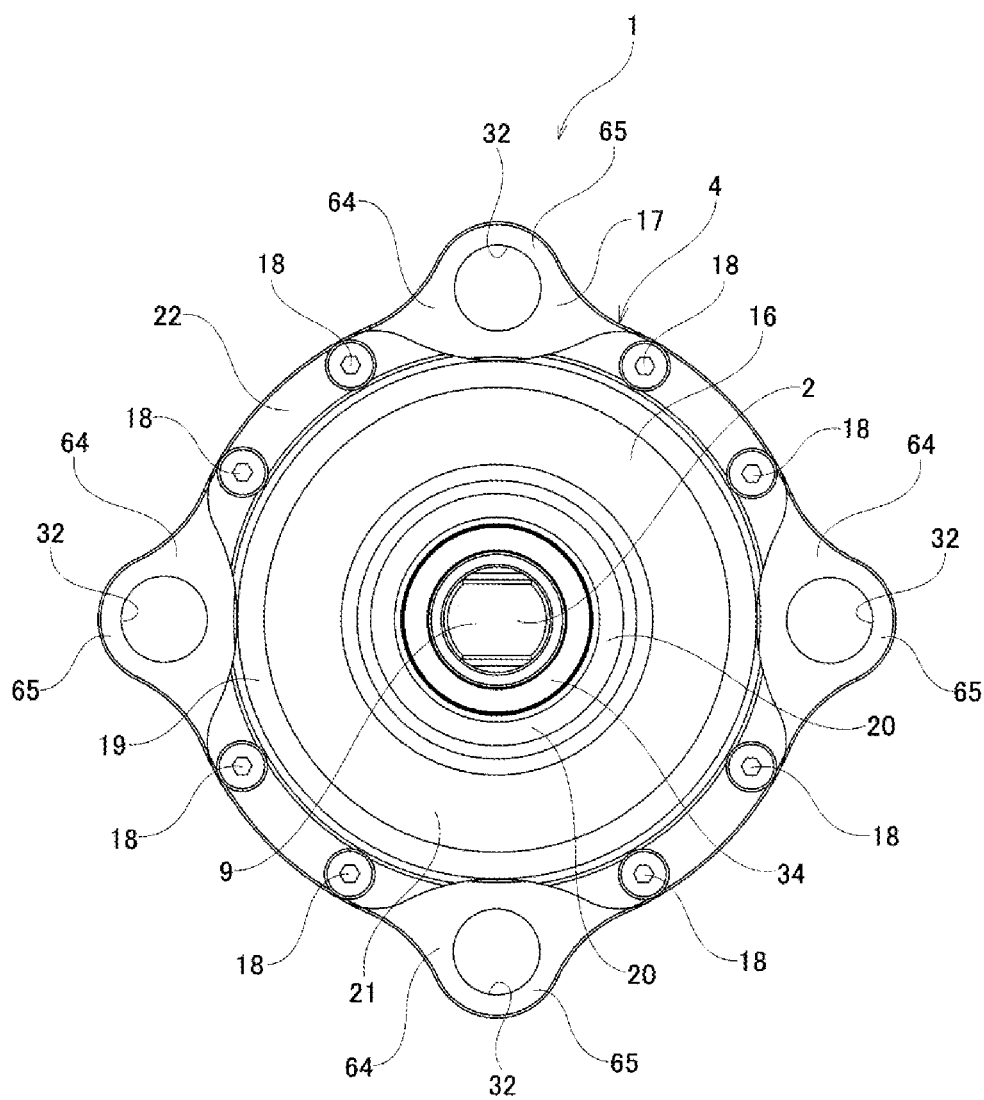
FIG. 2 is a view of the reverse-input blocking clutch of the first example as seen from the right side in FIG. 1

The housing 4, as illustrated in FIGS. 1 and 2, is formed into a hollow circular disk shape, and is fixed to a fixed member 62 that does not rotate during use so that the rotation of the housing 4 is restricted. The housing 4 is coaxially arranged with the input member 2 and the output member 3, and houses the pair of input-side engaging portions 6, the output-side engaging portion 13, the pair of engaging elements 5 and the like on the inner side thereof. The housing 4 is configured by coupling together an input-side housing element (main housing body) 16 arranged on the one side in the axial direction and an output-side housing element (housing cover) 17 arranged on the other side in the axial direction by bolts 18.

The input-side housing element 16 includes an input-side large diameter tubular portion 19 having a cylindrical shape, an input-side small diameter tubular portion 20 having a cylindrical shape, a side plate portion 21 having a hollow circular plate shape, and a flange portion 22.

The input-side large diameter tubular portion 19 has a pressed surface 24 around an inner peripheral surface thereof. That is, in this example, the input-side housing element 16 configures a first pressed member element. The pressed surface 24 is configured by a cylindrical surface centered on the center axis of the input-side housing element 16.

The input-side large diameter tubular portion 19 has an input-side in-row fitting surface 25 which configures an inner-diameter-side fitting surface around an outer peripheral surface of an end portion on the other side in the axial direction, which is a portion located on the other side in the axial direction from the flange portion 22. The input-side in-row fitting surface 25 is configured by a cylindrical surface centered on the center axis of the input-side housing element 16. The input-side small diameter tubular portion 20 has an input-side bearing fitting surface 26 in a portion from an end portion on the other side in the axial direction to an intermediate portion in the axial direction of an inner peripheral surface thereof. The input-side bearing fitting surface 26 is configured by a cylindrical surface centered on the center axis of the input-side housing element 16. In other words, the pressed surface 24, the input-side in-row fitting surface 25, and the input-side bearing fitting surface 26 are arranged coaxially with each other.

The input-side small diameter tubular portion 20 is coaxially arranged with the input-side large diameter tubular portion 19 on the one side in the axial direction of the input-side large diameter tubular portion 19.

The side plate portion 21 has a hollow circular plate-shaped end surface shape when viewed from the axial direction. An end portion on the outside in the radial direction of the side plate portion 21 is connected to an end portion on the one side in the axial direction of the input-side large diameter tubular portion 19, and an end portion on the inside in the radial direction of the side plate portion 21 is connected to an end portion on the other side in the axial direction of the input-side small diameter tubular portion 20.

The flange portion 22 protrudes toward the outer side in the radial direction from an intermediate portion in the axial direction of the input-side large diameter tubular portion 19. The flange portion 22 has through holes 23 penetrating in the axial direction at a plurality of locations in the circumferential direction. In this example, the flange portion 22 has through holes 23 penetrating in the axial direction at eight locations in the circumferential direction.

The output-side housing element 17 includes a tubular portion 63 having a cylindrical shape, an output-side small-diameter tubular portion 28 having a cylindrical shape, a side plate portion 29 having a hollow circular plate shape, and mounting portions 64. That is, in this example, the output-side housing element 17 configures a second pressed member element.

The tubular portion 63 has an output-side in-row fitting surface 30, which configures an outer-diameter-side fitting surface, around an inner peripheral surface of a portion on the one side in the axial direction. The output-side in-row fitting surface 30 is configured by a cylindrical surface centered on the center axis of the output-side housing element 17. The output-side in-row fitting surface 30 has an inner-diameter dimension capable of fitting with the input-side in-row fitting surface 25 of the input-side housing element 16 without looseness.

Further, the tubular portion 63 has screw holes 31 opening at an end surface on the one side in the axial direction at a plurality of locations in the circumferential direction that are aligned with the through holes 23 of the input-side housing element 16. In this example, the tubular portion 63 has screw holes 31 opening at the end surface on the one side in the axial direction at eight locations in the circumferential direction that are aligned with the eight through holes 23.

The output-side small-diameter tubular portion 28 is arranged coaxially with the tubular portion 63 on the other side in the axial direction of the tubular portion 63. The output-side small-diameter tubular portion 28 has an output-side bearing fitting surface 33 in a portion from an end portion on the one side in the axial direction to an intermediate portion of the inner peripheral surface. The output-side bearing fitting surface 33 is configured by a cylindrical surface centered on the center axis of the output-side housing element 17. That is, the output-side in-row fitting surface 30 and the output-side bearing fitting surface 33 are arranged coaxially with each other.

The side plate portion 29 has a hollow circular plate-shaped end surface shape when viewed from the axial direction. An end portion on the outside in the radial direction of the side plate portion 29 is connected to an end portion on the other side in the axial direction of the tubular portion 63, and an end portion on the inside in the radial direction of the side plate portion 29 is connected to an end portion on the one side in the axial direction of the output-side small-diameter tubular portion 28.

The mounting portions 64 are provided at a plurality of locations that are evenly spaced in the circumferential direction. In this example, four mounting portions 64 are provided at four locations that are evenly spaced in the circumferential direction. Each mounting portion 64 has a protruding portion 65 protruding from an outer peripheral surface of the tubular portion 63 toward the outside in the radial direction and a mounting hole 32 penetrating in the axial direction of the protruding portion 65.

The housing 4 is configured by coupling and fixing the input-side housing element 16 and the output-side housing element 17 together by fitting the input-side in-row fitting surface 25 of the input-side housing element 16 with the output-side in-row fitting surface 30 of the output-side housing element 17 without looseness, and screwing the coupling bolts 18 that are inserted through the through holes 23 respectively into the screw holes 31 respectively and further tightening them in a state where the side surface on the other side in the axial direction of the flange portion 22 of the input-side housing element 16 is in contact with the side surface on the one side in the axial direction of the tubular portion 63 of the output-side housing element 17.

In this example, the input-side in-row fitting surface 25 and the input-side bearing fitting surface 26 of the input-side housing element 16 are coaxially arranged with each other, and the output-side in-row fitting surface 30 and the output-side bearing fitting surface 33 of the output-side housing element 17 are coaxially arranged with each other. Therefore, in the assembled state of the housing 4 in which the input-side in-row fitting surface 25 is fitted without looseness with the output-side in-row fitting surface 30, the input-side bearing fitting surface 26 and the output-side bearing fitting surface 33 are coaxially arranged with each other.

In this example, the output-side housing element 17 is supported by and fixed to the fixed member 62 by screwing and further tightening the supporting bolts inserted into the mounting holes 32 into screw holes 66 provided in the fixed member 62. Due to this, the housing 4 is supported by and fixed to the fixed member 62.

In the assembled state of the housing 4, the input shaft portion 9 of the input member 2 is rotatably supported by an input-side bearing 34, which is an additional component of this example, with respect to the input-side bearing fitting surface 26 of the input-side housing element 16. Moreover, the output-shaft portion 12 of the output member 3 is rotatably supported by an output-side bearing 35, which is an additional component of this example, with respect to the output-side bearing fitting surface 33 of the output-side housing element 17. As a result, the input member 2 and the output member 3 are coaxially arranged with each other, and coaxially arranged with the pressed surface 24 of the housing 4. Furthermore, in this state, the pair of input-side engaging portions 6 and the output-side engaging portion 13 are arranged on the inner side in the radial direction of the pressed surface 24 of the housing 4.

Here, regarding the reverse-input blocking clutch 1, in a case where it is desired to increase the performance level of switching from a locked state or semi-locked state (described later) to an unlocked state (lock releasing performance) or the like, it is necessary that the coaxiality and inclination of the input member 2 and the output member 3 be strictly managed. In such a case, it is possible to apply methods of common bearing usage such as changing both the input-side bearing 34 and the output-side bearing 35 from single-row rolling bearings as illustrated in the drawings to double-row rolling bearings. In a case of implementing the present invention, the input-side bearing may be omitted if the coaxiality of the input member with respect to the pressed surface is ensured. Further, the output-side bearing may be omitted if the coaxiality of the output member with respect to the pressed surface is ensured.

Each engaging element 5 of the pair of engaging elements 5 has a pressing surface 39 facing the pressed surface 24, an input-side engaged portion 47 that can be engaged with the input-side engaging portion 6, and an output-side engaged portion 40 that can be engaged with the output-side engaging portion 13, and is arranged on the inner side in the radial direction of the pressed surface 24 so as to move in a first direction which is a direction away from or toward the pressed surface 24 (a direction that connects the center axis of the reverse-input blocking clutch 1 and the central portion in the circumferential direction of the outer-side surface in the radial direction of the engaging element 5, in other words, vertical direction indicated by arrow a in FIG. 4). The engaging element 5 includes only one body plate 36 having the pressing surface 39 and the output-side engaged portion 40. The pair of engaging elements 5 are arranged so as to sandwich the output-side engaging portion 13 from both sides in the radial direction. In this example, the number of the engaging element 5 is two, and each of the engaging elements 5 is arranged so as to move in the first direction with respect to the pressed surface 24. However, in a case of implementing the present invention, the number of the engaging element can also be set to one, or three or more, as long as the pressing surfaces 39 of the engaging element 5 is arranged so as to move in the first direction with respect to the pressed surface 24. Since the relationship between each engaging element 5 of the pair of engaging elements 5, the pressed surface 24, the input-side engaging portions 6, and the output-side engaging portion 13, and their functions are common, in the following description, from the view point of simplifying the explanation, only one of the engaging elements 5 will be described except for the explanation regarding the arrangement of the engaging elements 5.

In this example, the engaging element 5 includes the body plate 36, a pair of link members 37, and a oscillation-support shaft 38.

In this example, the body plate 36 has a substantially semi-circular plate shape. In this example, the thickness dimension of the body plate 36 is smaller than the dimension in the axial direction of the output-side engaging portion 13. The body plate 36 includes a pair of pressing surfaces 39 facing the pressed surface 24, an output-side engaged portion 40, and a oscillation-support portion 41.

In this example, the outer peripheral surface of the body plate 36 is configured by an outer-side surface in the radial direction that has a convex arc-shape and corresponds to an arc of the body plate 36, and an inner-side surface in the radial direction that has a crank shape and corresponds to a chord of the body plate 36. Note that the radial direction of the body plate 36 refers to the vertical direction in FIGS. 4 to 6 orthogonal to the chord of the body plate 36, and refers to a direction away from or toward the body plate 36 with respect to the pressed surface 24. Moreover, the width direction of the body plate 36 refers to the horizontal direction indicated by arrow 8 in FIG. 5 that is parallel to the chord of the body plate 36, and refers to a direction orthogonal to both the radial direction of the body plate 36 and to the axial direction of the pressed surface 24. In this example, the radial direction of the body plate 36 is the direction of movement of the body plate 36 of the engaging element 5 when moving away from or toward the pressed surface 24 and corresponds to the first direction. Furthermore, in this example, the width direction of the body plate 36 corresponds to a second direction that is orthogonal to both the first direction and to the axial direction of the pressed surface 24.

The pair of engaging elements 5 is arranged on the inner side in the radial direction of the pressed surface 24 in a state in which the outer-side surfaces in the radial direction of the body plates 36 are faced toward the opposite sides and the inner-side surfaces in the radial direction of the body plates 36 are faced to each other. The inner-diameter dimension of the pressed surface 24 and the dimension in the radial direction of the body plates 36 are regulated so that gaps exist, in this state, in at least either of a portion between the pressed surface 24 and the outer-side surface in the radial direction of each of the body plates 36 and a portion between the inner-side surfaces in the radial direction of the body plates 36 that allow the body plates 36 to move in the radial direction.

The pair of pressing surfaces 39 is provided at two locations so as to be separated in the circumferential direction of the outer-side surface in the radial direction of the body plate 36. The pair of pressing surfaces 39, in the locked state or semi-locked state of the output member 3, is a portion that is pressed against the pressed surface 24. The pair of pressing surfaces 39 protrudes further toward the pressed surface 24 than portions of the outer-side surface in the radial direction of the body plate 36 that are separated from the pair of pressing surfaces 39 in the circumferential direction. Each of the pressing surfaces 39 is configured by a convex surface having a partially cylindrical shape and having a radius of curvature that is smaller than a radius of curvature of the pressed surface 24. A portion of the outer-side surface in the radial direction of the body plate 36 that is located between the pair of pressing surfaces 39 in the circumferential direction is a non-contact surface that does not come in contact with the pressed surface 24.

The output-side engaged portion 40 is configured by a concave portion provided on a side surface of the body plate 36 that is farther from the pressed surface 24. More specifically, the output-side engaged portion 40 is configured by a concave portion having a substantially rectangular shape that is recessed outward in the radial direction at a central portion in the width direction of the inner-side surface in the radial direction of the body plate 36. The pair of engaging elements 5 is, as illustrated in FIGS. 4 to 6, arranged so as to sandwich the output-side engaging portion 13 from the outer sides in the radial direction by the output-side engaged portions 40 thereof.

Figure 5:
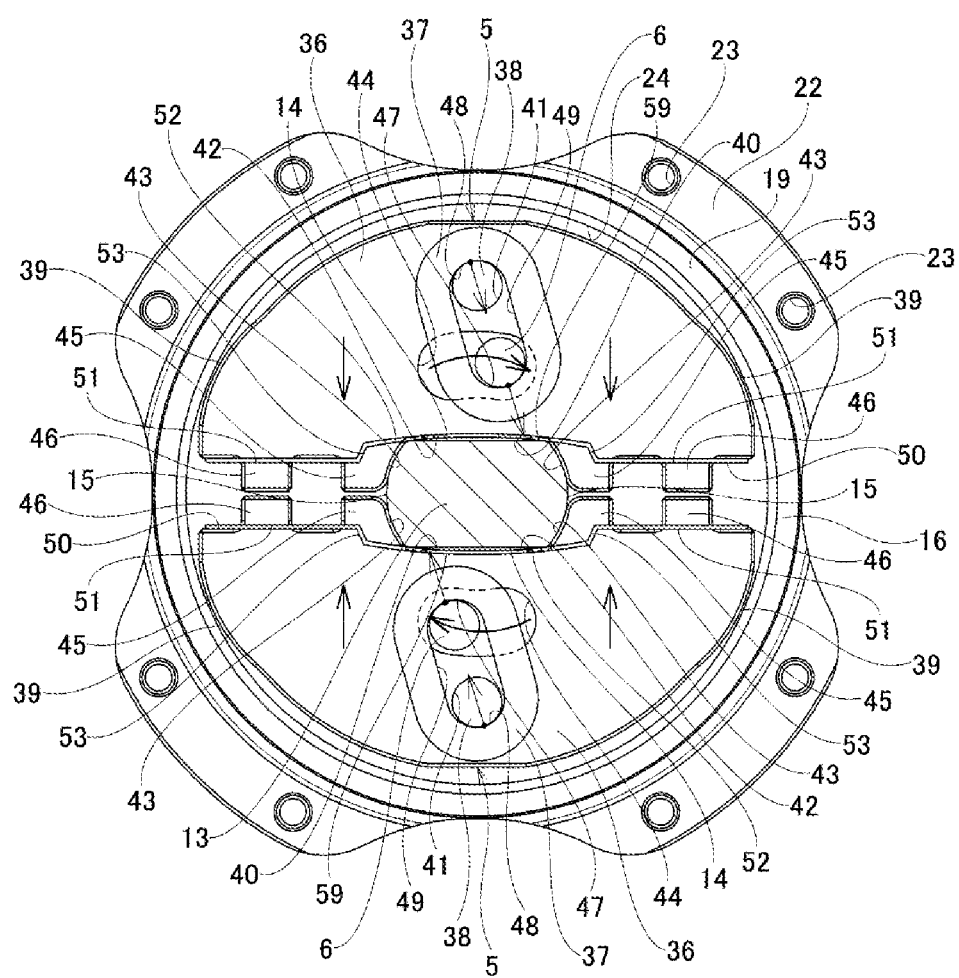
FIG. 5 is a view similar to FIG. 4 and illustrates a state where rotational torque is input to the input member.
Figure 6:
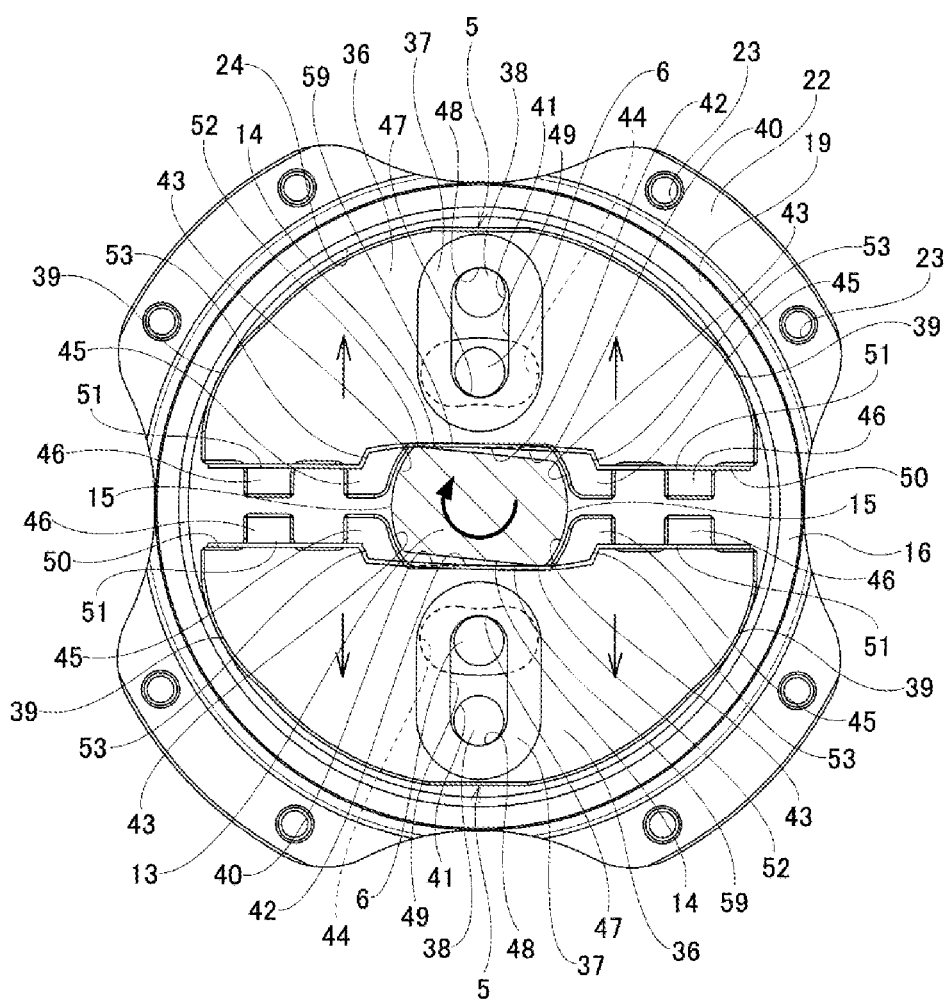
FIG. 6 is a view similar to FIG. 4 and illustrates a state where rotational torque is reversely input to the output member.
Figure 7:
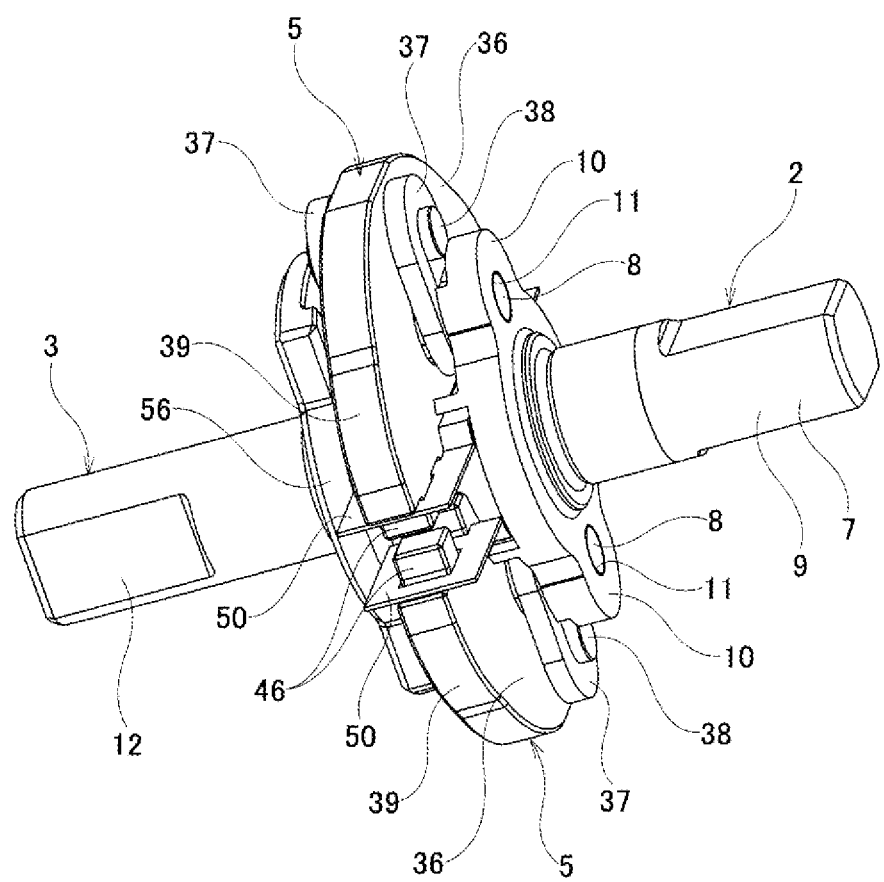
FIG. 7 is a perspective view of the reverse-input blocking clutch of the first example with the housing, the input-side bearing, and the output-side bearing removed.

The output-side engaged portion 40, as illustrated in FIGS. 4 to 6, FIG. 16(A), and FIG. 16(B), has a size such that a front-half portion in the minor axis direction of the output-side engaging portion 13 can be arranged on the inner side thereof. The front-half portion in the minor axis direction of the output-side engaging portion 13 corresponds to, as in FIG. 4 for example, the upper half of the output-side engaging portion 13 with respect to the engaging element 5 arranged on the upper side and the lower half of the output-side engaging portion 13 with respect to the engaging element 5 arranged on the lower side. In particular, in this example, as illustrated in FIGS. 5 and 16(B), the output-side engaged portion 40 has an inner surface shape that coincides with the outer peripheral surface of the front-half portion in the minor axis direction of the output-side engaging portion 13.

The inner surface of the output-side engaged portion 40 has a bottom surface 42 and a pair of guided surfaces 43 arranged on both sides of the bottom surface 42. The bottom surface 42 is configured by a flat surface that is orthogonal to the radial direction of the body plate 36. Of the inner surface of the output-side engaged portion 40, the guided surfaces 43 are arranged on end portions on both sides in the width direction of the body plate 36, and face each other in the width direction. The guided surfaces 43 are configured by concave curved surfaces that are inclined in directions such that the distance between the guides surfaces 43 increases as going toward the inner side in the radial direction of the body plate 36, or in other words, as going in a direction in the radial direction of the body plate 36 away from the pressed surface 24.

The guided surfaces 43 are able to come in contact with the guide surfaces 15 of the output-side engaging portion 13, and are configured by concave surfaces respectively having a partially cylindrical shape that has a radius of curvature that is the same as that of the guide surface 15, or have a radius of curvature that is slightly larger than that of the guide surface 15. In other words, in this example, as illustrated in FIGS. 5 and 16(B), the output-side engaged portion 40 has an inner-surface shape that coincides with the outer peripheral surface of the front-half portion in the minor axis direction of the output-side engaging portion 13. That is, the bottom surface 42 of the output-side engaged portion 40 can be brought into surface contact with the side surface 14 of the output-side engaging portion 13, and the guided surfaces 43 of the output-side engaged portion 40 can be brought into surface contact with the guide surfaces 15 of the output-side engaging portion 13. Note that in a case of implementing the present invention, the guided surfaces may be configured by non-cylindrical shaped concave surfaces such as partial elliptical tubular shape or the like.

The oscillation-support portion 41 is provided in an outer-side portion in the radial direction of the central portion in the width direction of the body plate 36. The oscillation-support portion 41 is a portion that oscillatably supports the link member 37 through the oscillation-support shaft 38. In this example, the oscillation-support portion 41 is configured by a circular hole corresponding to a plate-side through hole passing through in the axial direction of an outer-side portion in the radial direction of the central portion in the width direction of the body plate 36.

The body plate 36 further includes an insertion hole 44 in an inner-side portion in the radial direction of the central portion in the width direction. The insertion hole 44 is configured by an arc-shaped long hole that penetrates in the axial direction through the inner-side portion in the radial direction of the central portion in the width direction of the body plate 36, and that extends in the circumferential direction. The input-side engaging portion 6 is inserted into the insertion hole 44. The insertion hole 44 has a size that allows the input-side engaging portion 6 to be loosely inserted therein. Specifically, when the input-side engaging portion 6 is inserted into the inner side of the insertion hole 44, a gap in the circumferential direction and a gap in the radial direction of the body plate 36 exist between the input-side engaging portion 6 and the inner surface of the insertion hole 44. Therefore, the input-side engaging portion 6 is able to displace in the direction of rotation of the input member 2 with respect to the insertion hole 44 (body plate 36) due to the existence of the gap in the circumferential direction, and the insertion hole 44 (body plate 36) is able to displace in the radial direction of the body plate 36 with respect to the input-side engaging portion 6 due to the existence of the gap in the radial direction of the body plate 36. In other words, the size of the insertion hole 44 is regulated so that operation is not hindered due to interference between the inner peripheral edge of the insertion hole 44 and the input-side engaging portion 6 during operation of the reverse-input blocking clutch 1 which will be described later.

Figure 10:
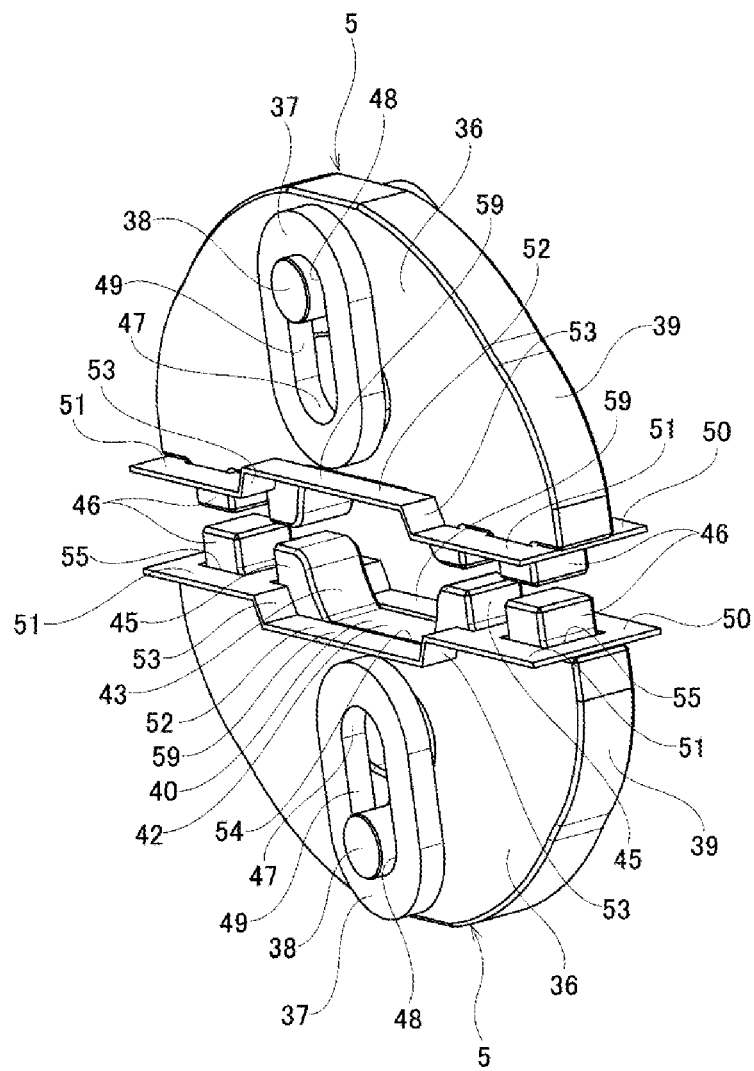
FIG. 10 is a perspective view of a pair of engaging elements each having an elastic member incorporated therein, which configure the reverse-input blocking clutch of the first example.

As particularly illustrated in FIG. 10, the body plate 36 has first convex portions 45 protruding toward the inner side in the radial direction at locations sandwiching the output-side engaged portion 40 from both sides in the width direction in the central portion in the width direction of the inner-side surface in the radial direction of the body plate 36. The body plate 36 has second convex portions 46 protruding toward the inner side in the radial direction in portions on both sides in the width direction of the inner-side surface in the radial direction of the body plate 36, which are located on the outer side in the width direction of the first convex portions 45.

The pair of link members 37 is arranged so as to sandwich the body plate 36 from both sides in the axial direction so as to be adjacent to the body plate 36 in the axial direction. However, in a case of implementing the present invention, it is also possible to arrange only one link member on only one side in the axial direction of the body plate 36.

Each of the link members 37 is a press-molded part that is made by punching a metal plate such as steel plate or the like by press working, and has a substantially rectangular or substantially oblong plate shape. The link member 37 has an input-side engaged portion 47 in an inner-side portion in the radial direction of the body plate 36, which is a portion on one side in the lengthwise direction of the link member 37, and has a oscillation-supported portion 48 in an outer-side portion in the radial direction of the body plate 36, which is a portion on the other side in the lengthwise direction of the link member 37. Particularly, in the construction of this example, the link members 37 has a long hole 49 that extends in the lengthwise direction. The input-side engaged portion 47 is configured by an end portion on the one side in the lengthwise direction of the long hole 49. The oscillation-supported portion 48 is configured by a link-side through hole which is an end portion on the other side in the lengthwise direction of the long hole 49. However, in a case of implementing the present invention, it is also possible to configure the input-side engaged portion by a circular hole passing through in the axial direction of the link member, and to configure the oscillation-supported portion by a link-side through hole which is a circular hole passing through in the axial direction of the link member.

The input-side engaging portion 6 is inserted through the input-side engaged portion 47. As a result, the portion on the one side in the lengthwise direction of the link member 37 is oscillatably connected to the input-side engaging portion 6.

The oscillation-support shaft 38 has a cylindrical shape, and is inserted through the oscillation-support portion 41 of the body plate 36 and the oscillation-supported portion 48 of the link member 37. As a result, the portion on the other side in the lengthwise direction of the link member 37 is oscillatably supported by the oscillation-support portion 41 of the body plate 36 through the oscillation-support shaft 38. In this example, the central portion in the axial direction of the oscillation-support shaft 38 is fitted with a loose fit into the oscillation-support portion 41 of the body plate 36 so as to relatively rotate, and portions on both sides in the axial direction are fitted into the oscillation-supported portions 48 of the link members 37 so as to relatively rotate. The central portion in the axial direction of the oscillation-support shaft 38 may also be fitted into the oscillation-support portion 41 of the body plate 36 by press fitting so as not to relatively rotate.

In a case of implementing the present invention, the oscillation-support portion of the body plate may be configured by a cylindrical protrusion and the oscillation-supported portion of the link member may be configured by a hole into which the cylindrical protrusion is fitted so as to relatively rotate. Alternatively, the oscillation-supported portion of the link member may be configured by a cylindrical protrusion and the oscillation-support portion of the body plate may be configured by a hole into which the cylindrical protrusion is fitted so as to relatively rotate.

Figure 14:
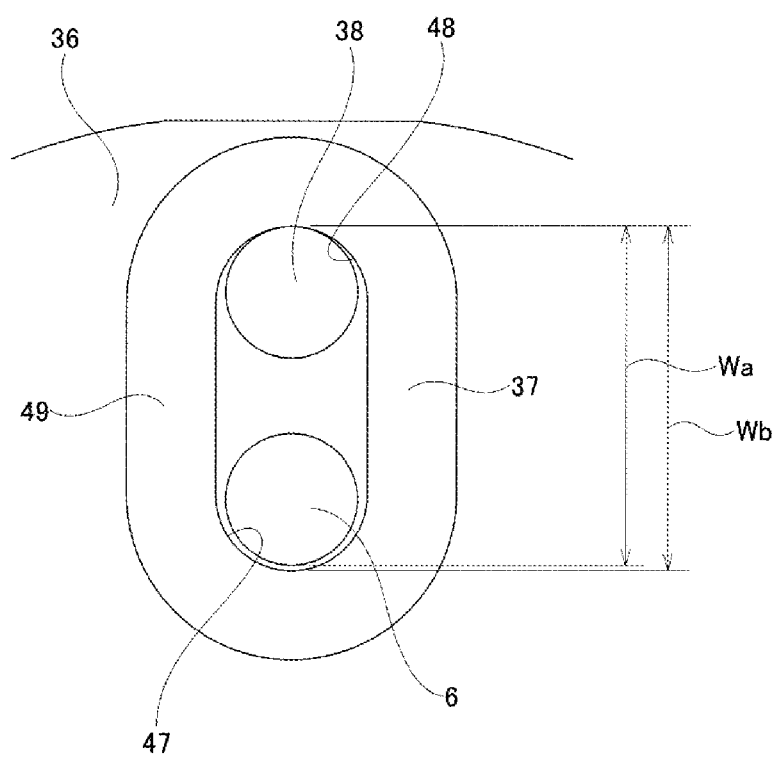
FIG. 14 is an enlarged view of the central portion in the horizontal direction of the upper half portion in FIG. 4.
Figure 15:
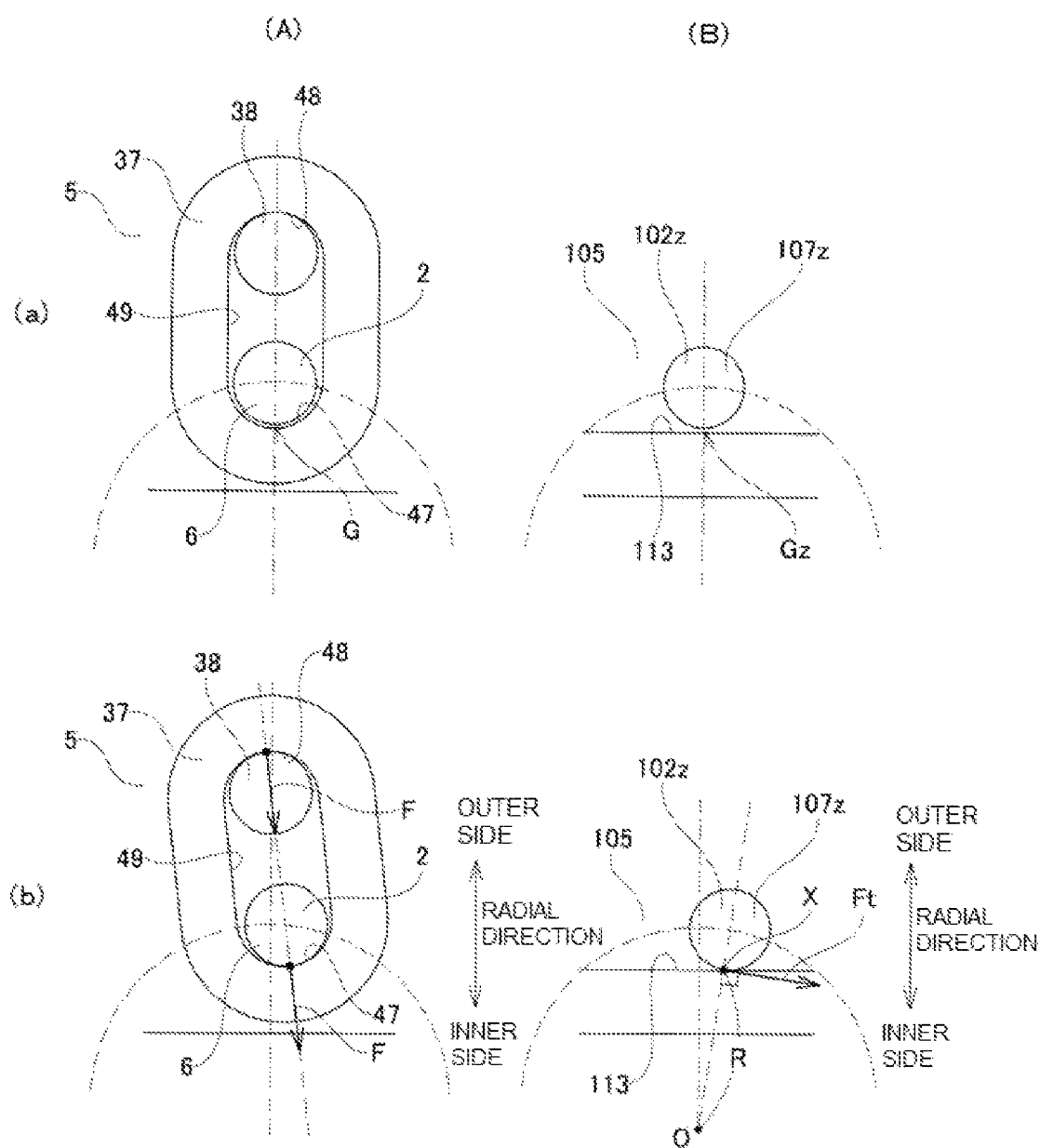
FIG. 15(A)(a) is a view of a construction of the first example, illustrating an engaging portion between the engaging element and the input-side engaging portion in a state before rotational torque is input to the input member, FIG. 15(A)(b) is a view illustrating a state after rotational torque is input to the input member from the state illustrated in FIG. 15(A)(a), FIG. 15(B)(a) is a view of a construction of a reference example which corresponds to a conventional construction, illustrating an engagement portion between the engaging element and the input-side engaging portion in a state before rotational torque is input to the input member, and FIG. 15(B)(b) is a view illustrating a state after rotational torque is input to the input member from the state illustrated in FIG. 15(B)(a).
Figure 16:
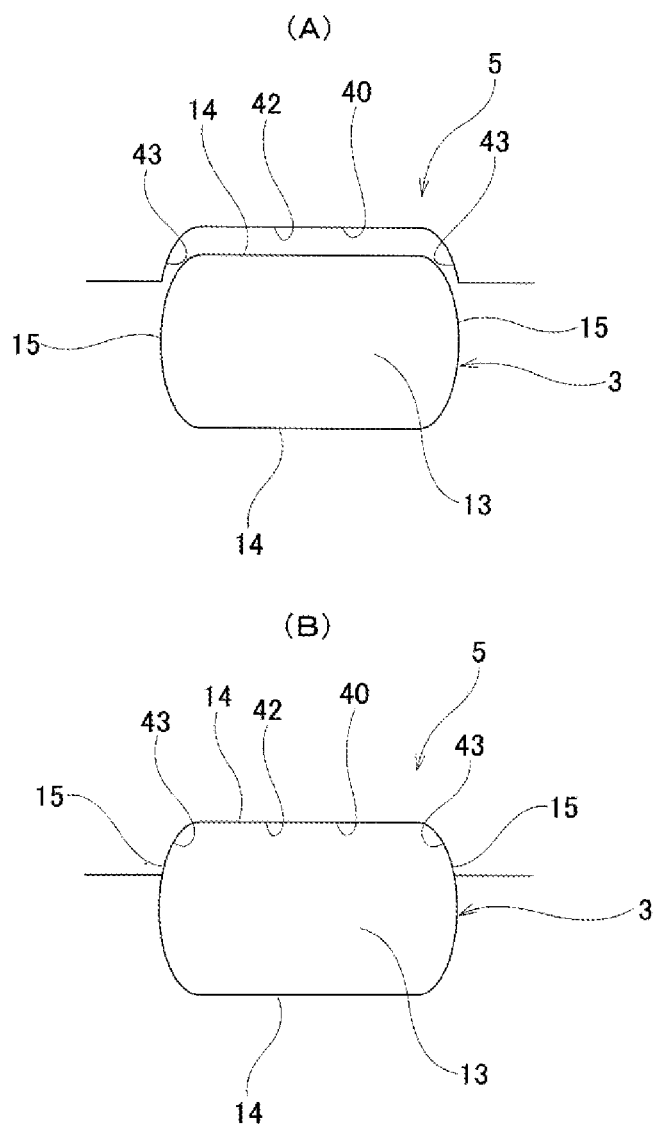
FIGS. 16(A) and 16(B) are views of the reverse-input blocking clutch of the first example, illustrating states before and after the output-side engaging portion and the output-side engaged portion are engaged.

In this example, as illustrated in FIGS. 4 and 6, in a state in which the pair of pressing surfaces 39 of the engaging element 5 comes in contact with the pressed surface 24 and the input-side engaging portion 6 is located in a central portion in the width direction of the body plate 36, as illustrated in FIG. 14, the distance Wa between the edges of the ends of the oscillation-support shafts 38 and the input-side engaging portion 6 that are on the far sides from each other is set to be equal to or less than the distance Wb between the edges of the ends of the oscillation-supported portion 48 and the input-side engaged portion 47 that are on far sides from each other (Wa≤Wb). The difference Wb−Wa between the distance Wa and the distance Wb is preferably as large as possible from the viewpoint of simplifying assembly of the reverse-input blocking clutch 1. On the other hand, however, the difference Wb−Wa is preferably as small as possible from the viewpoint of being able to achieve an unlocked state by causing the engaging element 5 to immediately move inward in the radial direction when rotational torque is input to the input member 2 as will be described later.

The reverse-input blocking clutch 1 of this example includes a pair of elastic members 50 as an elastic member. In all usage states (operating states) including a neutral state (state illustrated in FIG. 4) in which rotational torque is not applied to either the input member 2 or the output member 3, each elastic member 50 of the pair of elastic members 50 is elastically held between the output-side engaging portion 13 and the engaging element 5 so as to press the output-side engaging portion 13 toward the far side from the pressed surface 24 in the first direction, in other words, toward the inner side in the radial direction, and presses the engaging element 5 toward the side closer to the pressed surface 24 in the first direction, in other words, toward the outer side in the radial direction.

That is, in all usage states including the neutral state, the elastic member 50 is held between the engaging element 5 and the output-side engaging portion 13 so that a part (in this example, portions on both sides in the width direction of the body plate 36) is pressed toward the inner side in the radial direction by the engaging element 5, and the other part (in this example, the central portion in the width direction of the body plate 36) is pressed toward the outer side in the radial direction by the output-side engaging portion 13, and the reaction force presses the engaging element 5 toward the outer side in the radial direction, and presses the output-side engaging portion 13 toward the inner side in the radial direction.

In all usage states including the neutral state, the elastic member 50 presses the engaging element 5 toward the outer side in the radial direction so as to press the pressing surface 39 of the engaging element 5 against the pressed surface 24. The reason why the pressing surface 39 of the engaging element 5 is pressed against the pressed surface 24 particularly in the neutral state is to achieve a locked state immediately when rotational torque is reversely input to the output member 3.

The elastic member 50 includes elastic pressing portions 59 arranged at positions separated on both sides in the axial direction with respect to the output-side engaged portion 40 of the body plate 36 in the axial direction of the pressed surface 24, and elastically presses the elastic pressing portions 59 against the output-side engaging portion 13.

The elastic member 50 is not fastened to either the output member 3 or the engaging element 5, but is elastically held between the output-side engaging portion 13 and the engaging element 5. However, in a case of implementing the present invention, the elastic member may be fastened to the engaging element or may be fastened to the output member. In a case of fastening the elastic member, it is possible to use various conventionally known fastening means such as screws, crimping, adhesion, or the like.

In this example, as illustrated in FIGS. 4, 10, and 13(A) to 13(C), the elastic member 50 is configured by a leaf spring. The elastic member 50 is arranged so as to extend in the width direction of the body plate 36 corresponding to the second direction. In this example, the elastic member 50 has a crank-shape. In this example, the dimension $W_{50}$ in the plate width direction (vertical direction in FIG. 13(A)) of the elastic member 50 is larger than the thickness dimension of the body plate 36 and smaller than the dimension in the axial direction of the output-side engaging portion 13.

In this example, the elastic member 50 includes support plate portions 51, a pressing plate portion 52, and connecting plate portions 53. The support plate portions 51 are configured in a long plate shape and arranged on both side portions in the extending direction of the elastic member 50. The pressing plate portion 52 is configured in a long plate shape, is substantially parallel to the support plate portions 51, and is arranged at a central portion in the extending direction of the elastic member 50. The connecting plate portions 53 connect end portions of the support plate portions 51 and end portions of the pressing plate portion 52 that are adjacent to each other in the length direction of the elastic member 50. The connecting plate portions 53 are arranged non-parallel to each other, and are inclined in directions away from the pressing plate portion 52 in the extending direction of the elastic member 50 as going away from the pressing plate portion 52 in the plate thickness direction of the support plate portions 51 and the pressing plate portion 52.

In a case of implementing the present invention, various shapes may be adopted for the shape of the elastic member according to the arrangement relationship between the engaging element and the output-side engaging portion and the construction of the bottom surface of the engaging element. In other words, various shapes may be adopted for the elastic member as long as the elastic member is elastically held between the output-side engaging portion and the engaging element in all usage states including the neutral state so as to press the output-side engaging portion in the first direction toward the far side from the pressed surface and press the engaging element in the first direction toward the side closer to the pressed surface. In this case, the pressing force applied from the elastic member to the output-side engaging portion may be directed to the far side from the pressed surface in the first direction as a whole, and the pressing force applied from the elastic member to the engaging element may be directed to the side closer to the pressed surface in the first direction as a whole. In other words, as long as these conditions are satisfied, the pressing force applied from the elastic member to each portion of the output-side engaging portion and the pressing force applied from the elastic member to each portion of the engaging element need not be directed in the first direction.

The elastic member 50 has a first through hole 54 at the central portion in the width direction of the body plate 36 (horizontal direction in FIGS. 13(A) and 13(B)) corresponding to the position aligned with the output-side engaged portion 40, the first through hole 54 extending in the width direction and passing through in the radial direction of the body plate 36 (front-back direction of the paper in FIG. 13(A), vertical direction in FIG. 13(B)) which corresponds to the first direction. In this example, the elastic pressing portions 59 are arranged on both sides of the first through hole 54 in the axial direction of the pressed surface 24 (vertical direction in FIG. 13(A), front-back direction of the paper in FIG. 13(B)). In this example, the elastic member 50 has second through holes 55 that pass through the body plate 36 in the radial direction thereof at portions sandwiching the first through hole 54 from both sides in the width direction, which correspond to positions separated from the first through hole 54 in the width direction of the body plate 36 corresponding to the second direction.

In this example, the first through hole 54 has a rectangular shape extending in the width direction of the body plate 36 as illustrated in FIG. 13(A) when viewed in the radial direction of the body plate 36. The first through hole 54 is provided so as to pass through the pressing plate portion 52, the connecting plate portions 53, and end portions on the side closer to the pressing plate portion 52 of the support plate portions 51. As can be seen from the fact that the first through hole 54 is arranged at a position aligned with the output-side engaged portion 40, the first through hole 54 is a portion for preventing the elastic member 50 from hindering direct engagement between the output-side engaging portion 13 and the output-side engaged portion. Each of the second through holes 55 has a rectangular shape as illustrated in FIG. 13(A) when viewed in the radial direction of the body plate 36. The second through holes 55 are provided so as to pass through intermediate portions of the support plate portions 51 in the width direction of the body plate 36.

In this example, the elastic member 50 is assembled to an inner-side portion in the radial direction of the body plate 36.

In this state, the first convex portions 45 of the body plate 36 are inserted into the first through hole 54 of the elastic member 50 without looseness, the second convex portions 46 of the body plate 36 are inserted into the second through holes 55 of the elastic member 50 without looseness, the outer-side surfaces in the radial direction of the intermediate portions in the plate width direction of the support plate portions 51 of the elastic member 50 come into contact with portions adjacent to both sides of the second convex portions 46 in the width direction of the body plate 36 among the inner-side surface in the radial direction of the body plate 36, and both side portions in the plate width direction of the elastic member 50 protrude toward both sides in the axial direction of the body plate 36.

In this example, based on the engagement between the elastic member 50 and the engaging element 5, in other words, based on engagement between the first through hole 54 and the first convex portions 45 and engagement between the second through holes 55 and the second convex portions 46, displacement of the elastic member 50 in a direction orthogonal to the radial direction corresponding to the first direction, in other words, displacement in the axial direction of the pressed surface 24 and displacement in the width direction of the body plate 36 corresponding to the second direction is regulated. Further, displacement of the elastic member 50 toward the outer side in the radial direction is regulated based on the fact that the outer-side surfaces in the radial direction of the support plate portions 51 come into contact with portions adjacent to both sides of the second convex portions 46 in the width direction of the body plate 36 among the inner-side surface in the radial direction of the body plate 36.

In a case of implementing the present invention, displacement of the elastic member 50 in a direction orthogonal to the radial direction corresponding to the first direction may also be regulated based on only of the engagement between the first through hole 54 and the first convex portions 45 and the engagement between the second through holes 55 and the second convex portions 46.

The pressing plate portion 52 of the elastic member 50 is arranged so as to span the output-side engaged portion 40 when viewed in the axial direction of the pressed surface. In other words, the intermediate portion in the length direction of the pressing plate portions 52 is arranged at the same position as the output-side engaged portion 40 in the width direction of the body plate 36 corresponding to the second direction. In this example, both side portions in the plate width direction of the pressing plate portion 52, in other words, both side portions of the pressing plate portion 52 sandwiching the first through hole 54 in the plate width direction corresponds to the pair of elastic pressing portions 59. The pair of elastic pressing portions 59 is arranged at portions separated on both sides in the axial direction with respect to the body plate 36. In a free state of the elastic member 50, the pair of elastic pressing portions 59 is located on the inner side in the radial direction from the bottom surface 42 of the output-side engaged portion 40, and arranged substantially parallel to the bottom surface 42.

Particularly, as illustrated in FIG. 4, in the neutral state in which the elastic member 50 is arranged between the output-side engaging portion 13 and the engaging element 5 and no rotational torque is applied to the input member 2 and the output member 3, the elastic pressing portions 59 come into surface contact with the side surface 14 of the output-side engaging portion 13 and flexurally deformed toward the outer side in the radial direction slightly. Therefore, the elastic member 50 is elastically held between the output-side engaging portion 13 and the engaging element 5. As a result, the support plate portions 51 elastically press the inner-side surface in the radial direction of the body plate 36 toward the outer side in the radial direction and the elastic pressing portions 59 elastically press the side surface 14 of the output-side engaging portion 13 toward the inner side in the radial direction.

As will be described later, when rotational torque is input to the input member 2 (see FIG. 5) and when rotational torque is reversely input to the output member 3 (see FIG. 6), the elastic member 50 is elastically deformed so as to bend the elastic pressing portions 59 toward the outer side in the radial direction, allowing the output-side engaging portion 13 and the output-side engaged portion 40 to directly engage.

The reverse-input blocking clutch 1 of this example includes a reinforcing member 56 that spans between tip end portions of the pair of input-side engaging portions 6 of the input member 2, in other words, the end portions on the other side in the axial direction of the input-side engaging pins 8 of the pair of input-side engaging pins 8.

Figure 9:
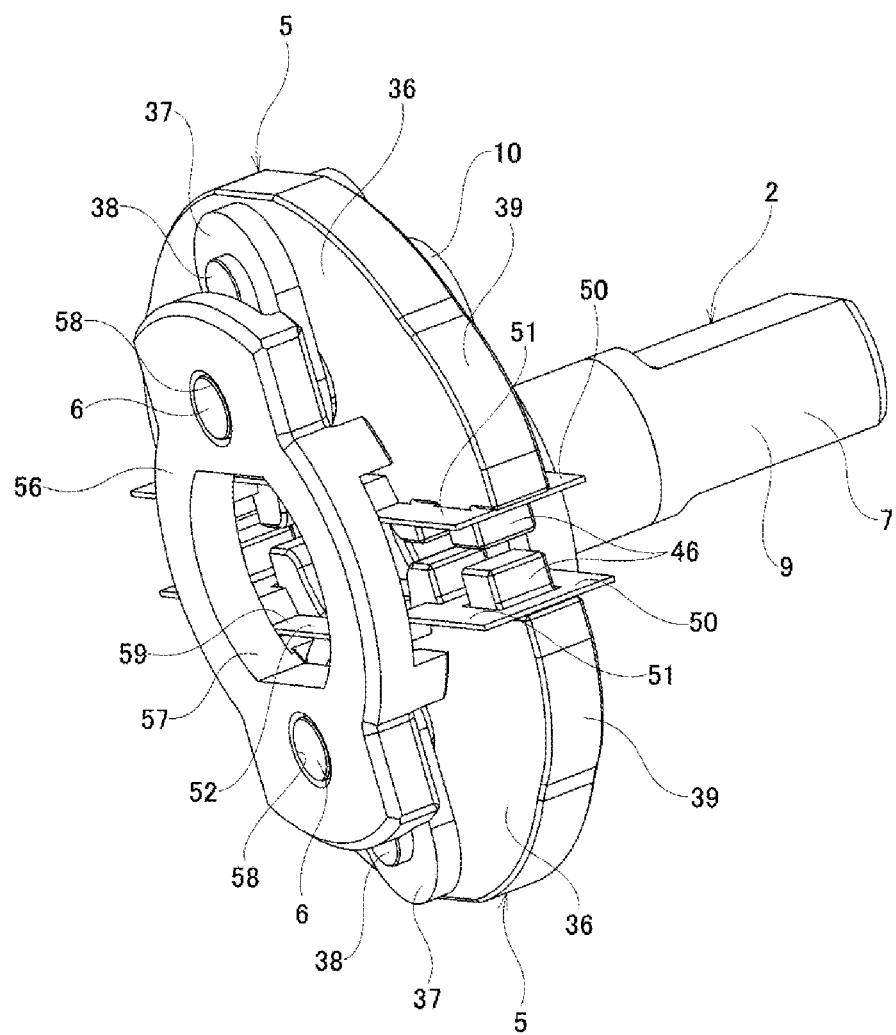
FIG. 9 is a perspective view of the reverse-input blocking clutch of the first example with the housing, the output member, the input-side bearing, and the output-side bearing removed.
Figure 11:
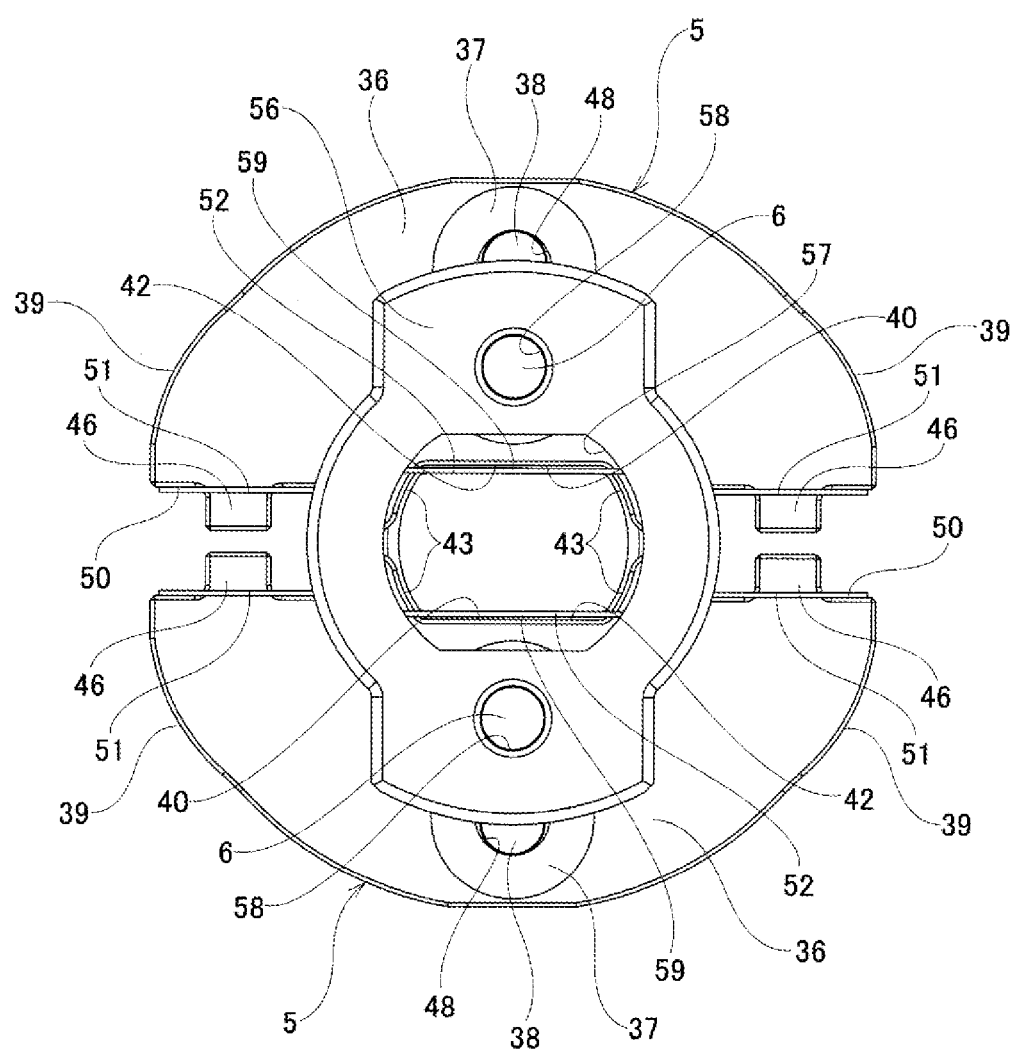
FIG. 11 is a view of the pair of engaging elements each having the elastic member incorporated therein and a reinforcing member of the reverse-input blocking clutch of the first example, as viewed from the output member side in the axial direction.
Figure 12:
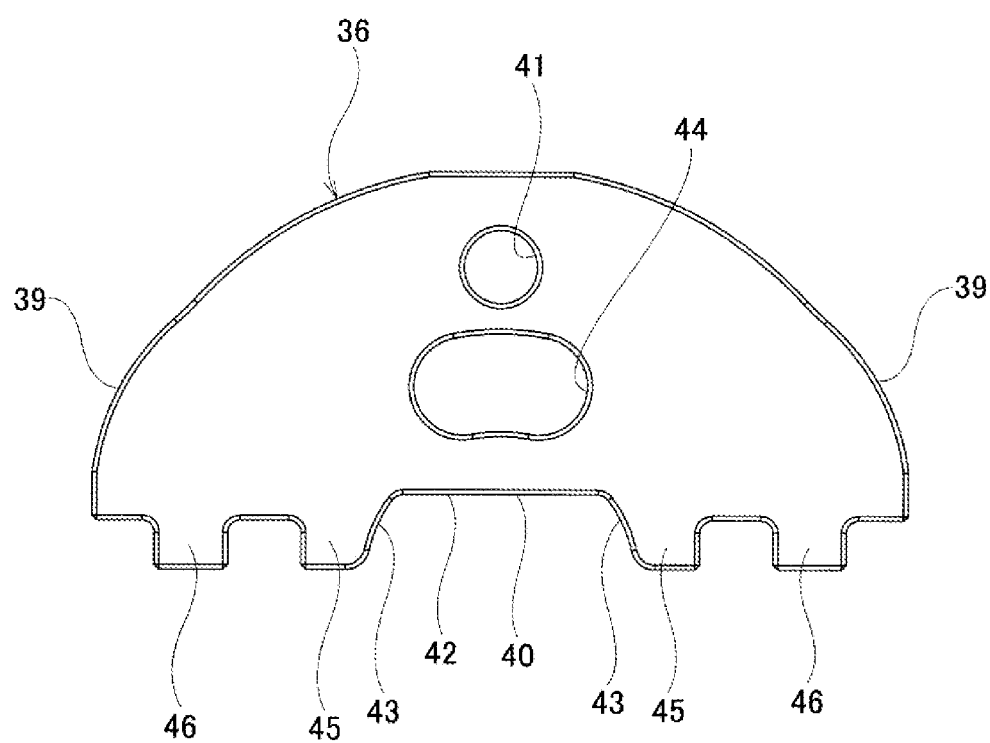
FIG. 12 is a view of a body plate of an engaging element of the reverse-input blocking clutch of the first example as viewed in the axial direction.
Figure 13:
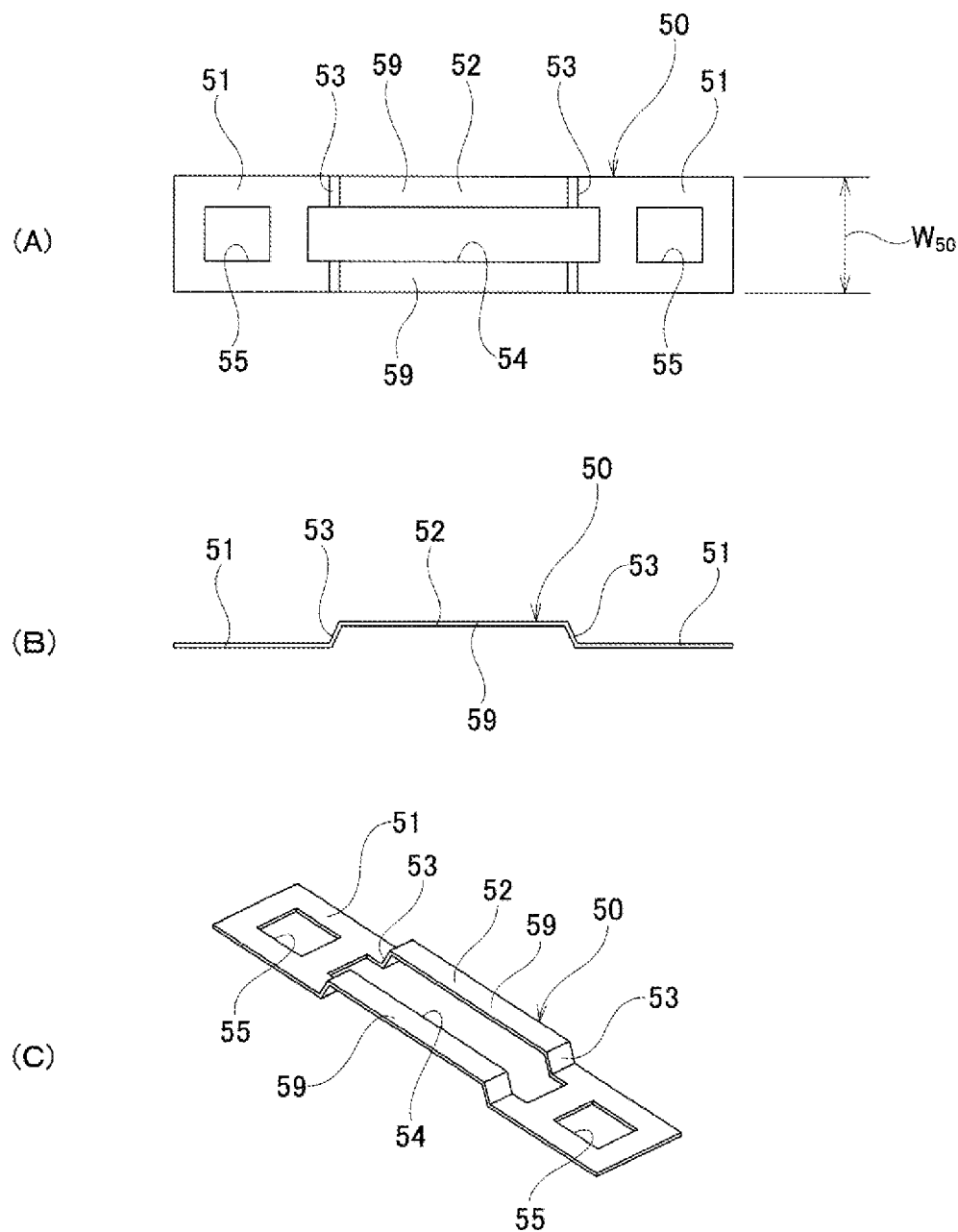
FIG. 13 is a view illustrating an elastic member of the reverse-input blocking clutch of the first example. Specifically.

As illustrated in FIGS. 8, 9, and 11, the reinforcing member 56 has a substantially rectangular plate shape as a whole. The reinforcing member 56 includes an insertion hole 57 having a substantially oval opening shape in a central portion thereof, and includes support holes 58 in portions sandwiching the insertion hole 57 from both sides in the minor axis direction of the insertion hole 57.

The output-side engaging portion 13 is inserted into the insertion hole 57. The insertion hole 57 has a size that allows the output-side engaging portion 13 to be loosely inserted. Therefore, the output-side engaging portion 13 can rotate inside the insertion hole 57 relative to the insertion hole 57 (reinforcing member 56).

Each of the support holes 58 has an inner-diameter dimension slightly smaller than the outer-diameter dimension of the tip-end portion of each of the input-side engaging portions 6. The reinforcing member 56 spans between the tip-end portions of the pair of input-side engaging portions 6 by press-fitting the tip-end portions of the pair of input-side engaging portions 6 into the support holes 58 of the reinforcing member 56.

In the construction of this example, a pair of engaging elements 5 and a pair of elastic members 50 are arranged between the input arm portions 10 which are parts of the input member 2 and the reinforcing member 56 in the axial direction. As a result, the positions in the axial direction of the pair of engaging elements 5 and the pair of elastic members 50 are regulated between the input arm portions 10 of the input member 2 and the reinforcing member 56.

Specifically, in this state, the side surfaces on the other side in the axial direction of the input arm portions 10 are brought into sliding contact with or brought to closely face the side surfaces on the one side in the axial direction of the oscillation-support shafts 38 and the side surfaces on the one side in the axial direction of the link members 37 on the one side in the axial direction. As a result, the oscillation-support shafts 38 are prevented from coming off from the oscillation-support portions 41 of the body plates 36 to the one side in the axial direction, and the link members 37 on the one side in the axial direction are prevented from coming off from the oscillation-support shafts 38 to the one side in the axial direction.

Further, the side surface on the one side in the axial direction of the reinforcing member 56 is brought into sliding contact with or brought to closely face the side surfaces on the other side in the axial direction of the oscillation-support shafts 38 and the side surfaces on the other side in the axial direction of the link members 37 on the other side in the axial direction. As a result, the oscillation-support shafts 38 are prevented from coming off from the oscillation-support portions 41 of the body plates 36 to the other side in the axial direction, and the link members 37 on the other side in the axial direction are prevented from coming off from the oscillation-support shafts 38 to the other side in the axial direction.

However, in a case of implementing the present invention, it is also possible to prevent the link members from coming off from the oscillation-support shafts by retaining rings or the like that are fitted at the end portions in the axial direction of the oscillation-support shafts.

In the construction of this example, the pair of engaging elements 5 and the pair of elastic members 50 are not strongly held from both sides in the axial direction by the input arm portions 10 of the input member 2 and the reinforcing member 56. Accordingly, the input arm portions 10 of the input member 2 and the reinforcing member 56 do not interfere the radial movement of the engaging elements 5 and the elastic members 50 and the oscillation of the link members 37.

In a case of implementing the present invention, as long as the positions in the axial direction of the pair of engaging elements 5 and the pair of elastic members 50 can be regulated and the radial movement of the engaging elements 5 and the elastic members 50 and the oscillation of the link members 37 are not interfered as described above, both end portions in the axial direction of the input-side engaging pins may be fitted inside the support holes respectively provided on the input arm portions and on the reinforcing member without interference. In this case, the input-side engaging pins may be prevented from coming off by retaining rings fitted at the end portions of the input-side engaging pins, the inner surface of the housing, and the like.

In a case of implementing the present invention, regulating the position in the axial direction of the elastic member 50 may also be performed only by the input arm portion 10 of the input member 2 and the reinforcing member 56. In this case, an engagement construction between the elastic member and the engaging element for regulating the position in the axial direction of the elastic member may be omitted.

Next, the operation of the reverse-input blocking clutch 1 of this example will be described.

As illustrated in FIG. 5, when a rotational torque is input to the input member 2 from the input-side mechanism, the input-side engaging portions 6 rotate in the direction of rotation of the input member 2 (clockwise direction in the example in FIG. 5). When this occurs, while the link members 37 is oscillated about the oscillation-support shafts 38, the input-side engaging portions 6 pull the oscillation-support shafts 38 through the link members 37 so that the engaging elements 5 (body plates 36) respectively moves to the inner side in the radial direction, which is a direction away from the pressed surface 24. As a result, the elastic members 50 are elastically deformed so that the pressing surfaces 39 of the engaging elements 5 are separated from the pressed surface 24 and the elastic pressing portions 59 as a whole is deformed toward the outer side in the radial direction. In other words, the elastic members 50 are elastically deformed so as to displace the respective support plate portions 51 to the inner side in the radial direction. Further, the pair of output-side engaged portions 40 of the engaging elements 5 hold the output-side engaging portion 13 of the output member 3 from both sides in the radial direction, and the output-side engaging portion 13 and the pair of output-side engaged portions 40 engage with no looseness. As a result, the rotational torque input to the input member 2 is transmitted to the output member 3 through the pair of engaging elements 5 and output from the output member 3.

Particularly, in the construction of this example, when the engaging element 5 moves to the inner side in the radial direction as described above, as illustrated in FIGS. 4 to 5 and FIGS. 16(A) to 16(B) over time, the guided surfaces 43 located on both sides in the width direction of the output-side engaged portion 40 are guided by the guide surfaces 15 located on both sides in the major axis direction of the front-half portion in the minor axis direction of the output-side engaging portion 13, regulating the movement of the engaging element 5 in the width direction. Then, as illustrated in FIGS. 5 and 16(B), the bottom surface 42 of the output-side engaged portion 40 comes into surface contact with the side surface 14 of the output-side engaging portion 13, and the guided surfaces 43 of the output-side engaged portion 40 come into surface contact with the guide surfaces 15 of the output-side engaging portion 13. Therefore, in the construction of this example, it is possible to effectively prevent the engaging element 5 from shifting in the width direction and from coming into contact with the pressed surface 24 after releasing the locked or semi-locked state. In the construction of this example, since the output-side engaging portion 13 can be used to guide the engaging element 5 to the inner side in the radial direction, the number of parts can be reduced compared to a construction in which a separate part used only for the guidance is incorporated.

In the construction of this example, the guided surfaces 43 of the output-side engaged portion 40 are configured by concave curved surfaces inclined in directions in which the distance between the two guided surfaces 43 increase as going toward the inner side in the radial direction, and the guide surfaces 15 of the output-side engaging portion 13 are configured by convex curved surfaces that match the concave curved surfaces. Therefore, as illustrated in FIG. 16(A), when the engaging element 5 is separated from the output-side engaging portion 13 to the outer side in the radial direction, a gap is formed between the guided surfaces 43 and the guide surfaces 15, and the size (dimension in the width direction) of the gap becomes larger as going toward the outer side in the radial direction. Therefore, in the construction of this example, in a state in which the engaging element 5 is separated from the output-side engaging portion 13 to the outer side in the radial direction, the movement of the engaging element 5 in the width direction and in the direction of rotation can be suitably allowed, and it is possible to effectively prevent excessive force from being applied to the engaging element 5.

On the other hand, when rotational torque is reversely input to the output member 3 from the output-side mechanism, as illustrated in FIG. 6, the output-side engaging portion 13 rotates between the pair of output-side engaged portions 40 in the direction of rotation of the output member 3 (clockwise direction in the example of FIG. 6). Then, corner portions that are the connecting portions between the side surfaces 14 and the guide surfaces 15 of the output-side engaging portion 13 elastically deform the elastic members 50 so as to displace a part of the elastic pressing portions 59 toward the outer side in the radial direction and directly press the bottom surfaces 42 of the output-side engaged portions 40. Due to this, the engaging element 5 is moved in a direction (outer side in the radial direction) closer to the pressed surface 24 so as to press the pressing surfaces 39 of the engaging element 5 against the pressed surface 24 to be frictionally engaged. As a result, the rotational torque reversely input to the output member 3 is completely blocked by being transmitted to the non-rotating housing 4 that is fixed to another member, alternatively, only a part of the rotational torque reversely input to the output member 3 is transmitted to the input member 2 and the remaining part is blocked.

In order to completely block the rotational torque reversely input to the output member 3 and prevent it from being transmitted to the input member 2, the engaging element 5 is held between the output-side engaging portion 13 and the pressed surface 24 to lock the output member 3 so that the pressing surfaces 39 do not slide or rotate relative to the pressed surface 24. On the other hand, in order to transmit only a part of the rotational torque reversely input to the output member 3 to the input member 2 and block the remaining part, the engaging element 5 is held between the output-side engaging portion 13 and the pressed surface 24 to semi-lock the output member 3 so that the pressing surfaces 39 slide against the pressed surface 24. When rotational torque is reversely input to the output member 3 in a state where the output member 3 is semi-locked, the engaging element 5 rotates about the rotation center of the output member 3 while causing the pressing surfaces 39 slide against the pressed surface 24 based on the engagement between the output-side engaging portion 13 and the output-side engaged portions 40. When the engaging element 5 rotates, the input-side engaging portion 6 is pulled by the oscillation-support shaft 38 through the link members 37, and a part of the rotational torque is transmitted to the input member 2.

In this example, since the engaging element 5 has pressing surfaces 39 at two locations separated in the circumferential direction of the outer-side surface in the radial direction of the body plate 36, the frictional engagement force between the pressed surface 24 and the pressing surfaces 39 can be increased by the wedge effect when rotational torque is reversely input to the output member 3. However, in a case of implementing the present invention, it is also possible to employ a construction having a pressing surface only at one location in the circumferential direction of the outer-side surface in the radial direction of the body plate.

In the reverse-input blocking clutch 1 of this example, the input-side housing element 16 having the pressed surface 24 and the output-side housing element 17 having the mounting portion 64 fixed to the fixed member 62 are configured separately. In other words, the input-side housing element 16 having the pressed surface 24 is not fixed directly to the fixed member 62 by bolting. Due to this, by screwing the supporting bolts inserted through the mounting holes 32 of the output-side housing element 17 into the screw holes 66 of the fixed member 62 and further tightening them, it is possible to prevent the input-side housing element 16 from being deformed with supporting and fixing the housing 4 to the fixed member 62. Accordingly, it is possible to prevent deterioration of the roundness of the pressed surface 24 provided on the inner peripheral surface of the input-side large-diameter tubular portion 19 of the input-side housing element 16. As a result, the locking performance of switching the reverse-input blocking clutch 1 from the unlocked state to the locked state or the semi-locked state may be well secured, and/or the controllability of the mechanical device in which the reverse-input blocking clutch 1 is incorporated may be well secured.

Further, the input-side in-row fitting surface 25 provided on the outer peripheral surface of the input-side large diameter tubular portion 19 of the input-side housing element 16 and the output-side in-row fitting surface 30 provided on the inner peripheral surface of the tubular portion 63 of the output-side housing element 17 are fitted without looseness. Accordingly, even if the pressed surface 24 is pressed toward outside in the radial direction by the pressing surfaces 39 of the engaging elements 5 as a result of the reverse input of the rotational torque to the output member 3, it is possible to prevent the pressed surface 24 from being deformed toward the outside in the radial direction.

As illustrated by double-dotted line in FIG. 1, the reverse-input blocking clutch 1 of this example may also include a reinforcing rib 67 spanning between the outer peripheral surface of the input-side small diameter tubular portion 20 of the input-side housing element 16 and the side surface on the one side in the axial direction of the side plate portion 21. By providing the reinforcing rib 67, deformation of the pressed surface 24 can be prevented more effectively.

With the reverse-input blocking clutch 1 according to this example, looseness of the output member 3 can be suppressed even in the neutral state.

In other words, in this example, the elastic members 50 are arranged at positions overlapping the output-side engaging portion 13 with regard to the radial direction of the body plates 36 which corresponds to the first direction, and are elastically held between the output-side engaging portion 13 and the engaging elements 5. Therefore, even in a case where the distance between the pair of bottom surfaces 42 in the assembled state of the reverse-input blocking clutch 1 is somewhat larger than the thickness dimension in the minor axis direction of the output-side engaging portion 13, that is the distance between the pair of side surfaces 14, considering the workability of the assembly work of the reverse-input blocking clutch 1, regardless of the gaps existing between the output-side engaging portion 13 and the output-side engaged portions 40, the output-side engaging portion 13 can be prevented from rotating with a light force, and looseness of the output member 3 can be suppressed. As a result, when the reverse-input blocking clutch 1 of this example is used for purposes such as adjusting the position of the stage fixed to the nut or adjusting the steering angle of a tire by connecting the output member 3 to a screw shaft of the ball screw device and connecting the input member 2 to an electric motor or the like, even if rotational torque is reversely input to the output member 3 from the stage or the tire through the nut, it is possible to prevent the position of the state and the steering angle of the tire from deviating vigorously from the position after adjustment. In other words, it is possible to moderate the progress of the displacement and prevent the occurrence of abnormal noise.

Although different from the construction of this example, when the engaging element includes two body plates separately arranged in the axial direction of the pressed surface, it is possible to easily avoid interference between the output-side engaged portion and the elastic member provided on the inner-side surfaces in the radial direction of the body plate by locating the elastic member between the two body plates. In other words, the output-side engaging portion of the output member and the output-side engaged portion of the body plates can be easily engaged directly without through the elastic member. On the other hand, as in the construction of this example, when the engaging element includes only one body plate, to avoid interference between the output-side engaged portion and the elastic member by the same method as described above, it is necessary to prepare a groove for installing the elastic member on the inner-side surface in the radial direction of the body plate. As a result, the shape of the body plate becomes complicated, and the difficulty of processing the body plate increases, which inevitably increases the manufacturing cost.

On the other hand, in the construction of this example, the elastic member 50 includes an elastic pressing portion 59 that is elastically pressed against the output-side engaging portion 13 of the output member 3, and the elastic pressing portion 59 is arranged separately on both sides in the axial direction with respect to the output-side engaged portion 40 of the body plate 36. As a result, interference between the output-side engaged portion 40 and the elastic member 50 provided on the inner-side surface in the radial direction of the body plate 36 can be easily avoided without preparing any groove for installing the elastic member 50 on the inner-side surface in the radial direction of the body plate 36. Therefore, since any groove for installing the elastic member 50 is not required to be prepared on the inner-side surface in the radial direction of the body plate 36, the shape of the body plate 36 can be simplified so that the degree of difficulty in processing the body plate 36 can be reduced and the manufacturing cost can be reduced. As long as the elastic member of the present invention does not hinder the engagement between the output-side engaging portion 13 and the output-side engaged portion 40 and includes the elastic pressing portion 59 that elastically presses the output-side engaging portion 13 toward the inner side in the radial direction, it can be applied not only to the construction in which the engaging element includes only one body plate, but also to the construction in which the engaging element includes two or more body plates.

In this example, the elastic member 50 is not fixed to either the output member 3 (output-side engaging portion 13) or the engaging element 5, but is elastically held between the output-side engaging portion 13 and the engaging element 5. Due to this, the work for fixing the elastic member 50 can be omitted, and the parts used for fixing it can be reduced. As a result, the manufacturing cost of the reverse-input blocking clutch 1 can be reduced. Further, since the installation space of the elastic member 50 can be reduced, the size of the reverse-input blocking clutch 1 can be reduced.

By engaging the elastic member 50 with the engaging element 5 (body plate 36), displacement of the elastic member 50 in the axial direction, the width direction, and the radial direction can be regulated. Therefore, even if the elastic member 50 is not fixed to either the output member 3 or the engaging element 5, it is possible to prevent the installation position of the elastic member 50 from deviating and to prevent the elastic member 50 from coming off from between the output-side engaging portion 13 and the engaging element 5. Accordingly, the elastic member 50 can apply elasticity of a desired magnitude and direction to the engaging element 5 and the output-side engaging portion 13.

The elastic member 50 has a function to press the pressing surface 39 of the engaging element 5 against the pressed surface 24 in the neutral state. Therefore, in the neutral state, there is no need to provide a dedicated component (biasing member such as a spring) for pressing the pressing surface 39 of the engaging element 5 against the pressed surface 24. Accordingly, the number of parts can be reduced, and the size of the reverse-input blocking clutch 1 can be reduced.

With the reverse-input blocking clutch 1 of this example, when rotational torque is input to the input member 2, it is possible to smoothly switch from the locked or semi-locked state to the unlocked state. This point will be described with reference to FIGS. 15(A) and 15(B).

FIGS. 15(A)(a) and 15(A)(b) illustrate mutual positional relationships between a part of the input member 2 and a part of an engaging element 5 in the construction of this example. More specifically, FIG. 15(A)(a) illustrates a positional relationship in the locked or semi-locked state illustrated in FIG. 6 in which the input-side engaging portion 6 is positioned in the central portion in the width direction of the engaging element 5 and the link member 37 is most radially inward. FIG. 15(A)(b) illustrates a positional relationship in a state where translational load F begins to act from the input-side engaging portion 6 to the oscillation-support shaft 38 through the link member 37 as rotational torque T is input to the input member 2 and the input-side engaging portion 6 rotates in a direction of rotation of the input member 2 (clockwise direction in the illustrated example) from the state illustrated in FIG. 15(A)(a).

On the other hand, FIG. 15(B)(a) and FIG. 15(B)(b) illustrate mutual positional relationships between a part of the input member 109z and a part of the engaging element 111 in the construction of a reference example in which a link member is not provided and an engaging element 111 that is integrally configured and has an input-side engaged portion 126 and an output-side engaged portion (not illustrated). More specifically, FIG. 15(B)(a) illustrates a positional relationship in the locked or semi-locked state in which the input-side engaging portion 113z is positioned in the central portion in the width direction of the engaging element 111. FIG. 15(B)(b) illustrates a positional relationship in a state where translational load Ft based on rotational torque T begins to act on the contact portion X between the input-side engaging portion 113z and the input-side engaged portion 126 from the state illustrated in FIG. 15(B)(a), as the input-side engaging portion 113z rotates in a direction of rotation of the input member 109z (clockwise direction in the illustrated example) and comes into contact with the input-side engaged portion 126 of the engaging element 111 due to the rotational torque T input to the input member 109z.

In the construction of the reference example, as illustrated in FIG. 15(B)(b), the direction of the translational load Ft, in other words, the direction of the load acting on the engaging element 111 from the input member 109z is greatly inclined with respect to the radial direction of the engaging element 111 (direction of the engaging element 111 moving away from or toward the pressed surface), which is a direction in which the engaging element 111 is to be moved when switching from the locked or semi-locked state to the unlocked state.

On the other hand, in the construction of this example, as illustrated in FIG. 15(A)(b), the direction of the translational load F, in other words, the direction of the load acting on the engaging element 5 from the input member 2 is mostly parallel with the radial direction of the engaging element 5 (direction of the engaging element 5 moving away from or toward the pressed surface 24), which is a direction in which the engaging element 5 is to be moved when switching from the locked or semi-locked state to the unlocked state. In other words, the angle between the direction of the translational load F and the direction in which the engaging element 5 is to be moved is smaller than the angle between the direction of the translational load Ft and the direction in which the engaging element 111 is to be moved in the construction of the reference example. That is, in the construction of this example, the rotational torque T input to the input member 2 can be efficiently converted into a load for moving the engaging element 5 to the inner side in the radial direction. Therefore, with the construction of this example, when rotational torque is input to the input member 2, it is possible to smoothly switch from the locked or semi-locked state to the unlocked state.

In the construction of this example, from the view point of simplifying assembly of the reverse-input blocking clutch, the size of the gap G (the difference Wb−Wa as described above) existing between the inner-side surface in the radial direction of the input-side engaging portion 6 and the inner peripheral surface of the input-side engaged portion 47 of the link member 37 in the state illustrated in FIG. 15(A)(a) and the size of the gap Gz existing between the inner-side surface in the radial direction of the input-side engaging portion 113z and the input-side engaged portion 126 in the state illustrated in FIG. 15(B)(a) are preferably as large as possible. On the other hand, from the view point of being able to achieve an unlocked state by immediately moving the engaging element 5, 111 to the inner side in the radial direction when rotational torque is input to the input members 2 or the input member 109z, the sizes of the gaps G, Gz are preferably as small as possible. Accordingly, taking the circumstances above into consideration, it is necessary in the production of the reverse-input blocking clutch to adjust the size of the gaps G, Gz to an appropriate size.

In the construction of the reference example, in order to adjust the size of the gap Gz, it may be necessary to finish a portion of the input-side engaged portion 126 that is in contact with the inner-side surface in the radial direction of the input-side engaging portion 113z with high precision by a cutting process, and in such a case, it is expected that the cost would increase. In the construction of this example, it is possible to adjust the size of the gap G by simply managing the distance between centers of the input-side engaged portion 47 and the oscillation-supported portion 48 of the link member 37, and since the link member 37 can be manufactured by inexpensive press working, it is easy to keep costs down.

Further, when the engaging element is configured by oscillatably supporting the link member having an input-side engaged portion on the body plate having a pressing surface, a construction is conceivable in which a pair of body plates are separately arranged in the axial direction and one link member is oscillatably arranged between the pair of body plates. However, in such a construction, the pair of body plates is required to be connected in a state of being separated in the axial direction, so that the number of parts increases. Further, in the locked or semi-locked state, the body plates are required to have high shape accuracy in order to bring the pressing surfaces of the pair of body plates into contact or sliding contact with the pressed surface.

On the other hand, in this example, a construction is adopted in which a pair of link members 37 each having an input-side engaged portion 47 on both sides in the axial direction of the body plate 36 having a pressing surface 39 so as to be oscillatably supported with respect to the body plate 36. Therefore, the number of parts can be suppressed and the shape accuracy of the body plate 36 is not required to be excessively increased, an increase in manufacturing cost can be suppressed. Further, when rotational torque is input from the input member 2 and the engaging element 5 moves to the inner side in the radial direction, the body plate 36 can be prevented from inclining in the axial direction.

Since the reinforcing member 56 is provided so as to span between the tip-end portions of the pair of input-side engaging portions 6, the pair of input-side engaging portions 6 can be prevented from deforming in directions away from each other. The reason for this will be described below.

When rotational torque is reversely input to the output member 3, the pressing surfaces 39 of the pair of engaging elements 5 are pressed against the pressed surface 24, and the pressing surfaces 39 frictionally engage with the pressed surface 24 so that the reverse-input blocking clutch 1 is switched to the locked or semi-locked state. As the rotational torque reversely input to the output member 3 increases, the force pressing the pressing surfaces 39 against the pressed surface 24 also increases, and the frictional engagement force acting between the pressing surfaces 39 and the pressed surface 24 also increases.

When rotational torque is input to the input member 2, the pair of input-side engaging portions 6 moves the body plates 36 through the link members 37 and the oscillation-support shafts 38 in directions in which the pressing surfaces 39 are moved away from the pressed surface 24, and the pressing surfaces 39 separate from the pressed surface 24. As a result, the reverse-input blocking clutch 1 is switched to the unlocked state.

If the rotational torque that is reversely input to the output member 3 is large and the frictional engagement force that acts between the pressing surfaces 39 and the pressed surface 24 is large when the reverse-input blocking clutch 1 switches to the locked or semi-locked state, the torque (release torque) required to switch the reverse-input blocking clutch 1 from the locked or semi-locked state to the unlocked state increases. In a construction that does not include the reinforcing member 56 as in this example, if the release torque becomes large and the force applied to the input-side engaging portions 6 from the link members 37 and directed outward with respect to the radial direction of the body plates 36 increases when switching the reverse-input blocking clutch 1 from the locked or semi-locked state to the unlocked state, the input-side engaging portions 6 of the input member 2 may possibly be deformed so as to be curved away from each other. When such deformation occurs, uneven contact may occur between the input-side engaging portions 6 and the input-side engaged portions 47, and when switching the reverse-input blocking clutch 1 from the locked or semi-locked state to the unlocked state, the body plates 36 may incline in the axial direction, making it difficult to smoothly switch to the unlocked state.

In the reverse-input blocking clutch 1 of this example, since the reinforcing member 56 is provided so as to span between the tip-end portions of the pair of input-side engaging portions 6, it is possible to prevent the input-side engaging portions 6 from deforming in directions away from each other. As a result, it is possible to prevent uneven contact between the input-side engaging portions 6 and the input-side engaged portions 47 so as to suppress the occurrence of wear and to prevent the body plates 36 from inclining in the axial direction, making it possible to smoothly switch to the unlocked state.

In this example, of the inner peripheral surface of the input-side large diameter tubular portion 19, a hardened layer is formed only on the pressed surface 24 and its vicinity by induction hardening, and then polished. Due to this, the dimensional accuracy and roundness of the pressed surface 24 are well secured while securing the hardness of the pressed surface 24. Further, the reverse-input blocking clutch 1 can be smoothly switched from an unlocked state to a locked state or a semi-locked state.

Second Example

Figure 17:
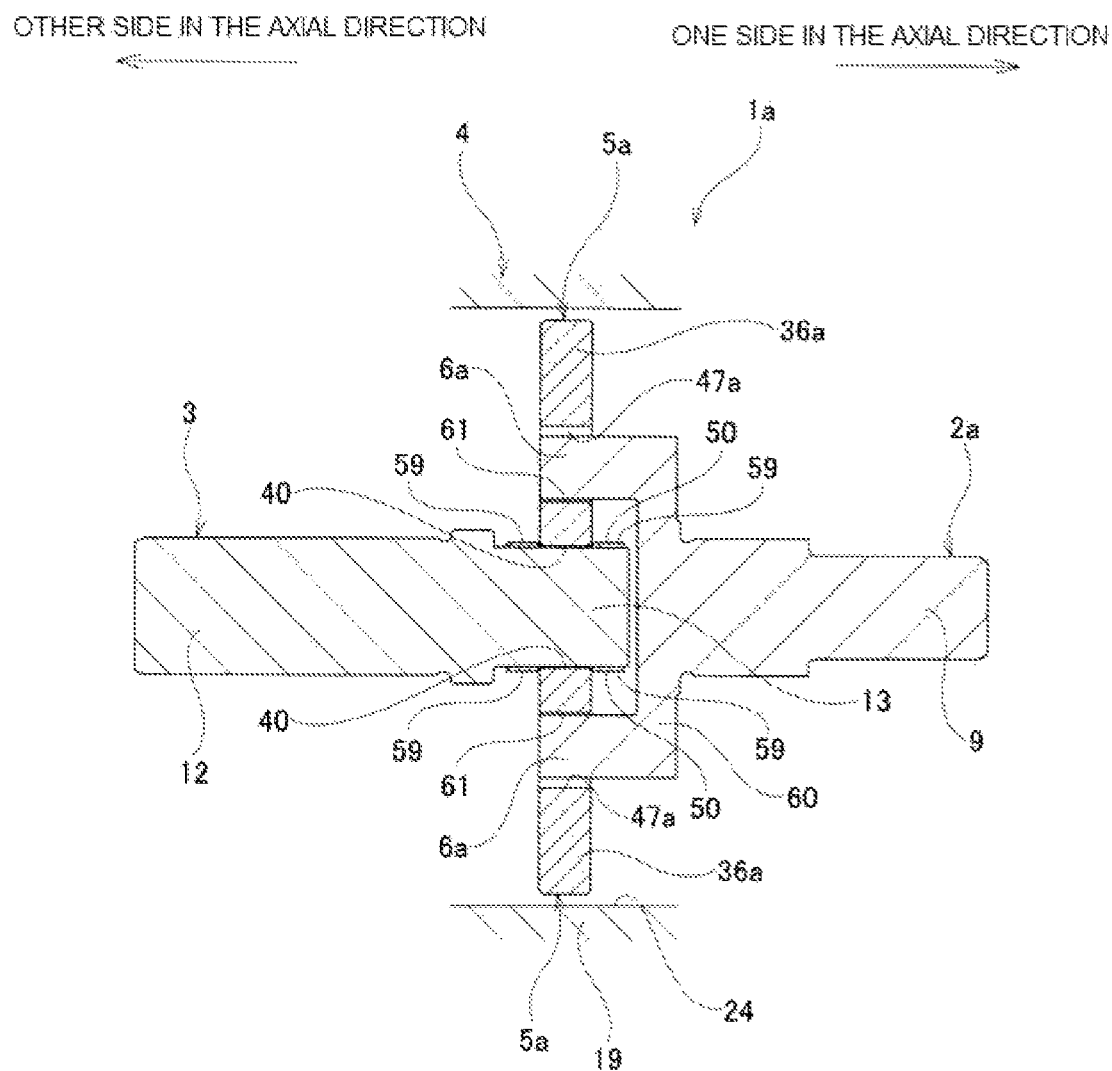
FIG. 17 is a cross sectional view illustrating a part of the reverse-input blocking clutch of a second example of an embodiment of the present invention.
Figure 18:
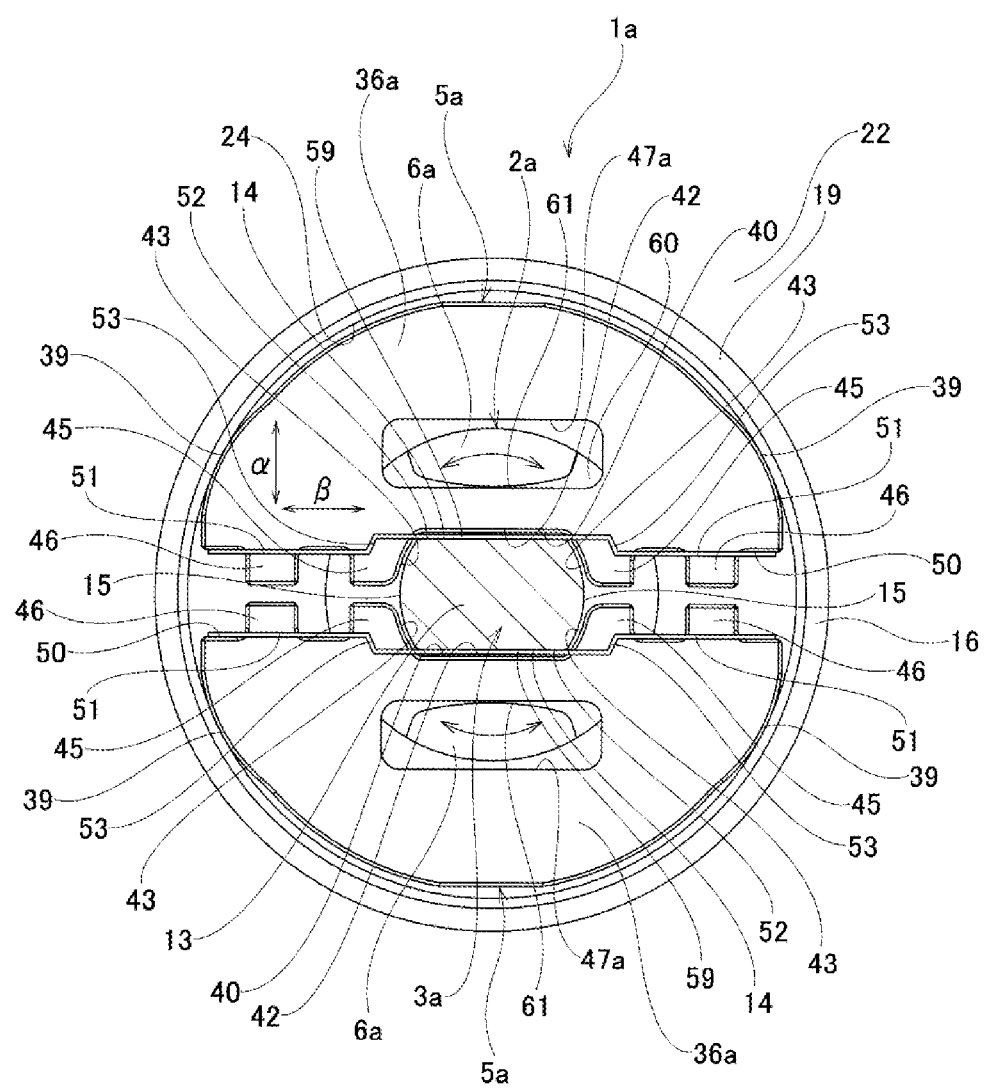
FIG. 18 is a view corresponding to FIG. 4, illustrating a part of the reverse-input blocking clutch of the second example.

A second example of an embodiment of the present invention will be described using FIGS. 17 to 19.

In the reverse-input blocking clutch 1a of this example, the construction of the input member 2a and the pair of engaging elements 5a are partially different from that of the first example. In the following description, only parts of the construction of the second example that differ from the first example will be described.

In this example, the input member 2a has an input shaft portion 9, a base plate portion 60, and a pair of input-side engaging portions 6a.

The base plate portion 60 has a substantially circular end surface shape when viewed from the axial direction.

The input shaft portion 9 protrudes from a central portion of the side surface on the one side in the axial direction of the base plate portion 60 toward the one side in the axial direction. The pair of input-side engaging portions 6a protrudes from two locations on the opposite sides in the radial direction of the side surface on the other side in the axial direction of the base plate portion 60 toward the other side in the axial direction. In this example, each input-side engaging portion 6a of the pair of input-side engaging portions 6a has a substantially elliptical end surface shape extending in the circumferential direction when viewed from the axial direction. In a case of implementing the present invention, the pair of input-side engaging portions may be configured by components that are made separately from the base plate portion.

Each engaging element 5a of the pair of engaging elements 5a is configured by only one body plate 36a having a pressing surface 39 and an output-side engaged portion 40. Regarding the body plate 36a, the shape of the outer-side surface in the radial direction including the pair of pressing surfaces 39 and the shape of the inner-side surface in the radial direction including the output-side engaged portion 40 are the same as in the first example.

The body plate 36a has an input-side engaged portion 47a. In this example, the input-side engaged portion 47a has a substantially rectangular opening shape extending in the width direction of the body plate 36a when viewed from the axial direction, and is configured by a through hole passing through in the axial direction at an intermediate portion in the radial direction of a central position in the width direction of the body plate 36a. The input-side engaged portion 47a has a size that allows the input-side engaging portion 6a to be loosely inserted. Therefore, in a state where the input-side engaging portion 6a is inserted inside the input-side engaged portion 47a, a gap exists in the width direction and in the radial direction of the body plate 36a respectively between the input-side engaging portion 6a and the inner surface of the input-side engaged portion 47a. Accordingly, the input-side engaging portion 6a can be displaced in a direction of rotation of the input member 2a with respect to the input-side engaged portion 47a, and the body plate 36a provided with the input-side engaged portion 47a can be displaced in the radial direction of the body plate 36a with respect to the input-side engaging portion 6a. In this example, the input-side engaged portion 47a includes a flat surface 61 facing outward in the radial direction at an end portion of the inner peripheral surface on the inner side with regard to the radial direction of the body plate 36a.

In the assembled state of the reverse-input blocking clutch 1a, the pair of input-side engaging portions 6a of the input member 2a is inserted in the axial direction into the input-side engaged portions 47a of the pair of engaging elements 5a. In a case of implementing the present invention, as in the case of the first example, a reinforcing member which spans between the tip-end portions of the pair of input-side engaging portions 6a.

Figure 19:
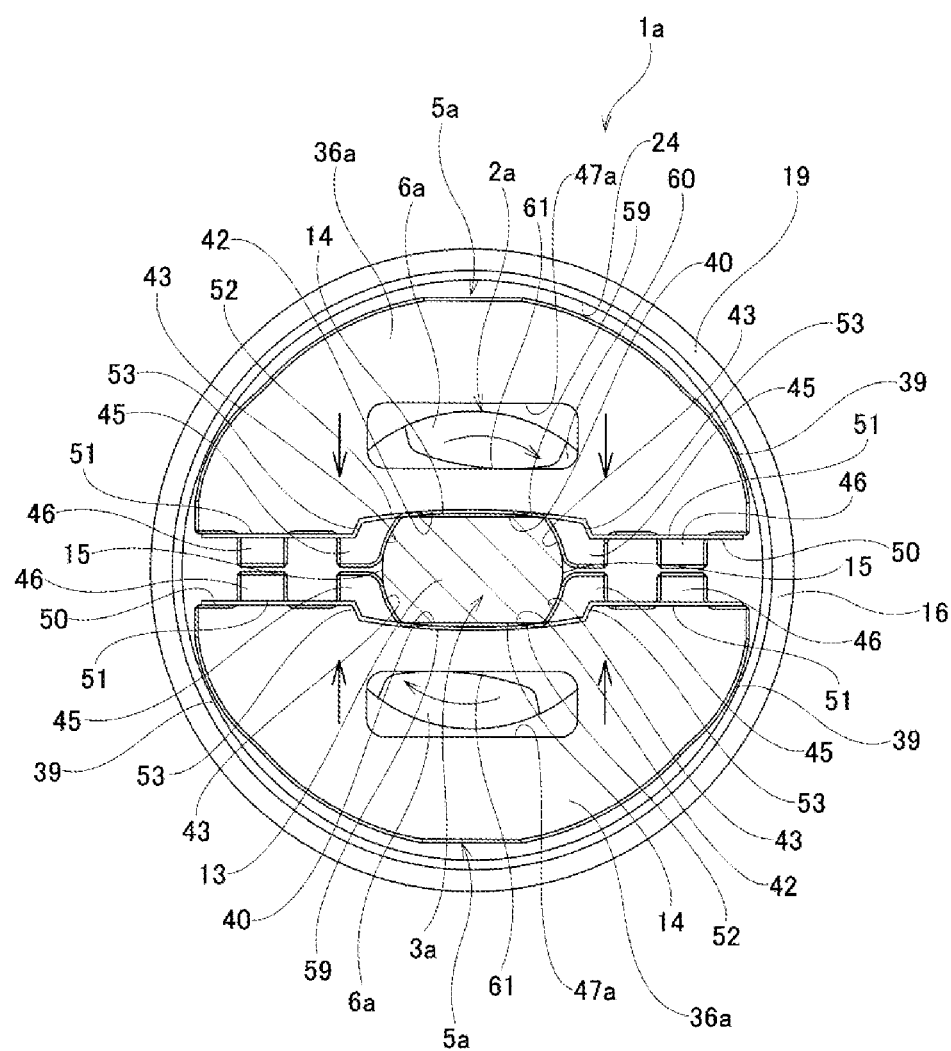
FIG. 19 is a view corresponding to FIG. 5, illustrating a part of the reverse-input blocking clutch of the second example.

When rotational torque is input to the input member 2a from the input-side mechanism, as illustrated in FIG. 19, the input-side engaging portion 6a rotates in a direction of rotation of the input member 2a on the inner side of the input-side engaged portion 47a. Then, the inner-side surface in the radial direction of the input-side engaging portion 6a presses the flat surface 61 of the input-side engaged portion 47a inward in the radial direction, and the engaging element 5a moves away from the pressed surface 24. As a result, the pressing surface 39 of the engaging element 5a is separated from the pressed surface 24. Along with this, the elastic member 50 elastically deforms so that the elastic pressing portion 59 of the elastic member 50 displaces to the outer side in the radial direction. Then, the pair of output-side engaged portions 40 of the pair of engaging elements 5a hold the output-side engaging portion 13 of the output member 3 from both sides in the radial direction so that the output-side engaging portion 13 and the pair of output-side engaged portions 40 engage with no looseness. As a result, the rotational torque input to the input member 2a is transmitted to the output member 3 through the pair of engaging elements 5a, and is output from the output member 3.

On the other hand, when rotational torque is reversely input to the output member 3 from the output-side mechanism, by the same operation as in the case of the first example illustrated in FIG. 6, the elastic member 50 elastically deforms, and the rotational torque that is reversely input to the output member 3 is completely blocked by being transmitted to the housing 4 and is not transmitted to the input member 2a, or only a part of the rotational torque reversely input to the output member 3 is transmitted to the input member 2a and the remaining part is blocked.

In the reverse-input blocking clutch 1a of this example, since each engaging element 5a of the pair of engaging elements 5a is configured only by one body plate 36a and does not have a link member and an oscillation-support shaft, the number of parts can be reduced. The other configuration and operational effects are the same as in the first example.

Third Example

Figure 20:
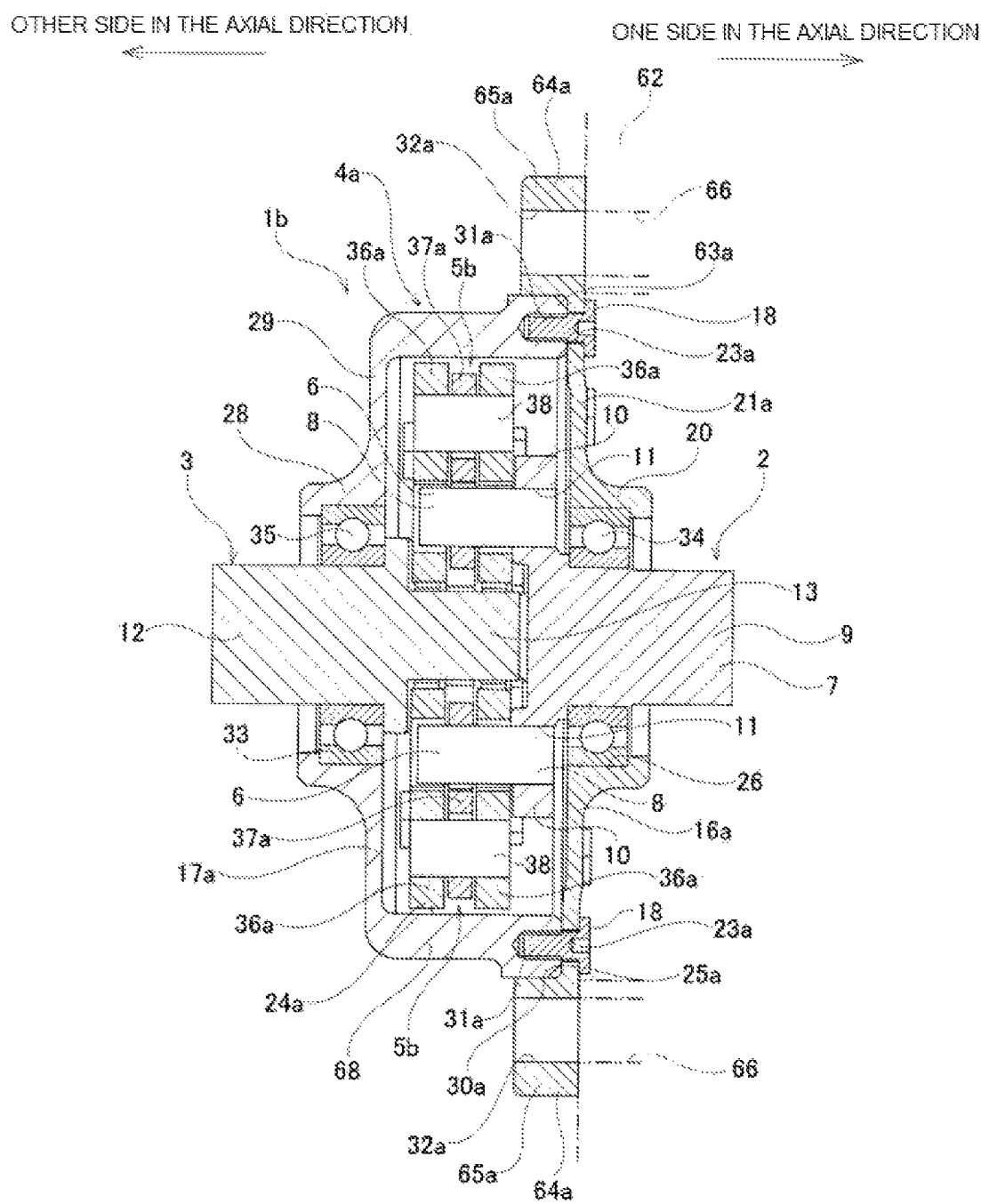
FIG. 20 is a cross sectional view illustrating the reverse-input blocking clutch of a third example of an embodiment of the present invention.
Figure 21:
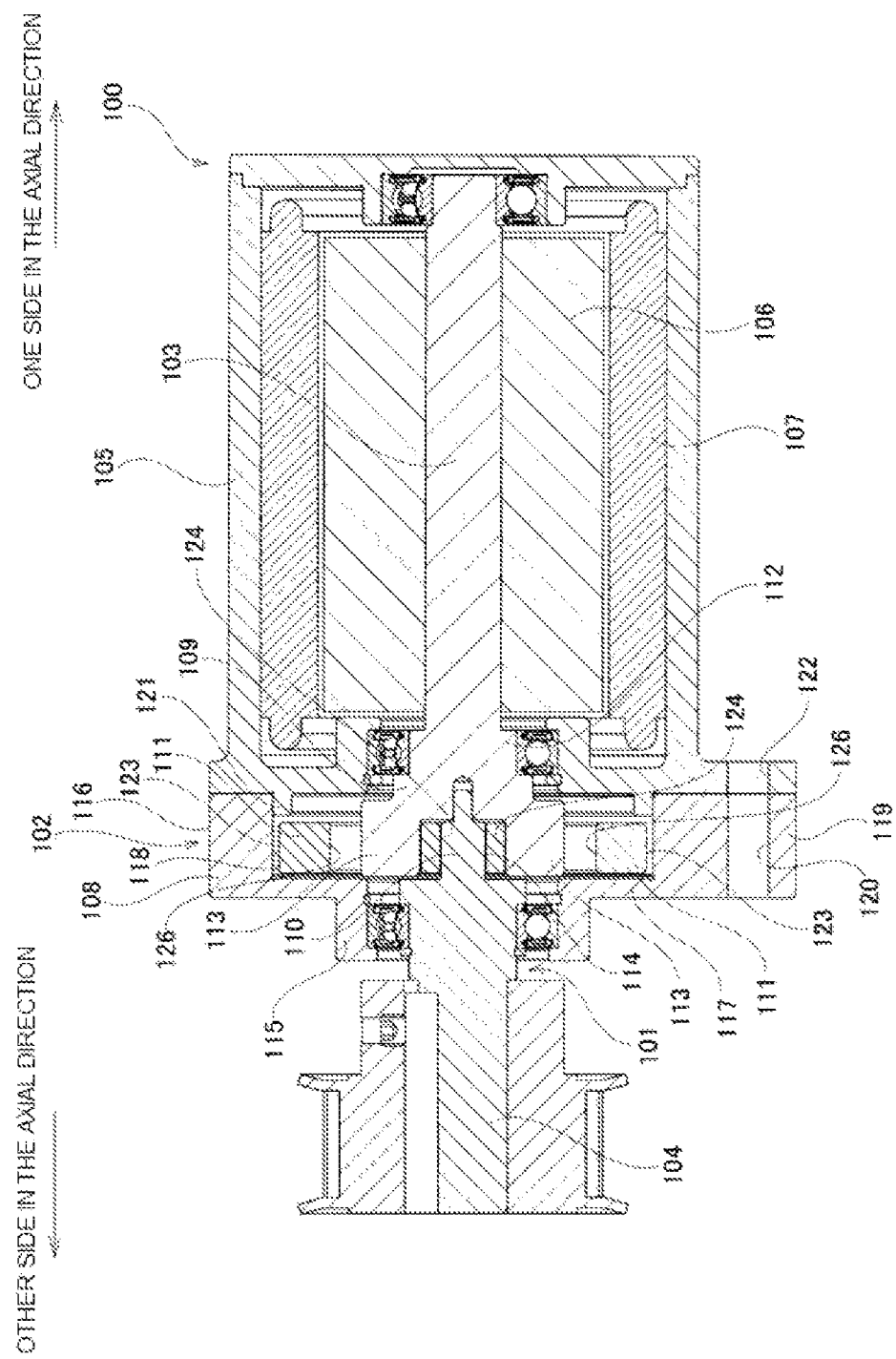
FIG. 21 is a cross sectional view illustrating a conventional reverse-input blocking clutch.
Figure 22:
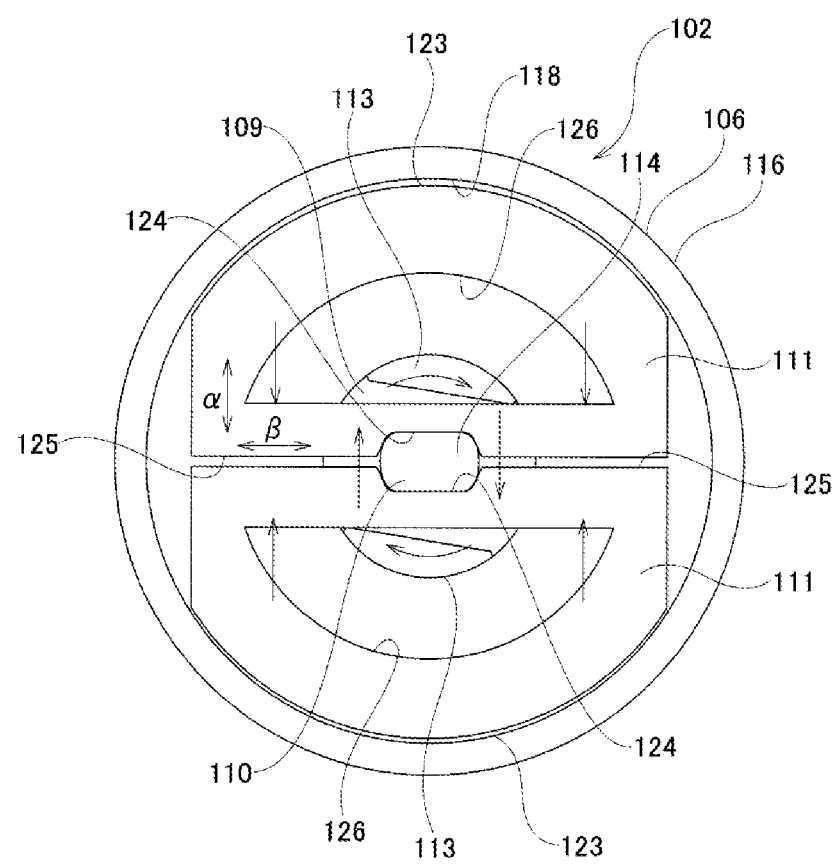
FIG. 22 is a cross sectional view of section B-B in FIG. 21, illustrating the conventional reverse-input blocking clutch in a state where rotational torque is input to the input member.
Figure 23:
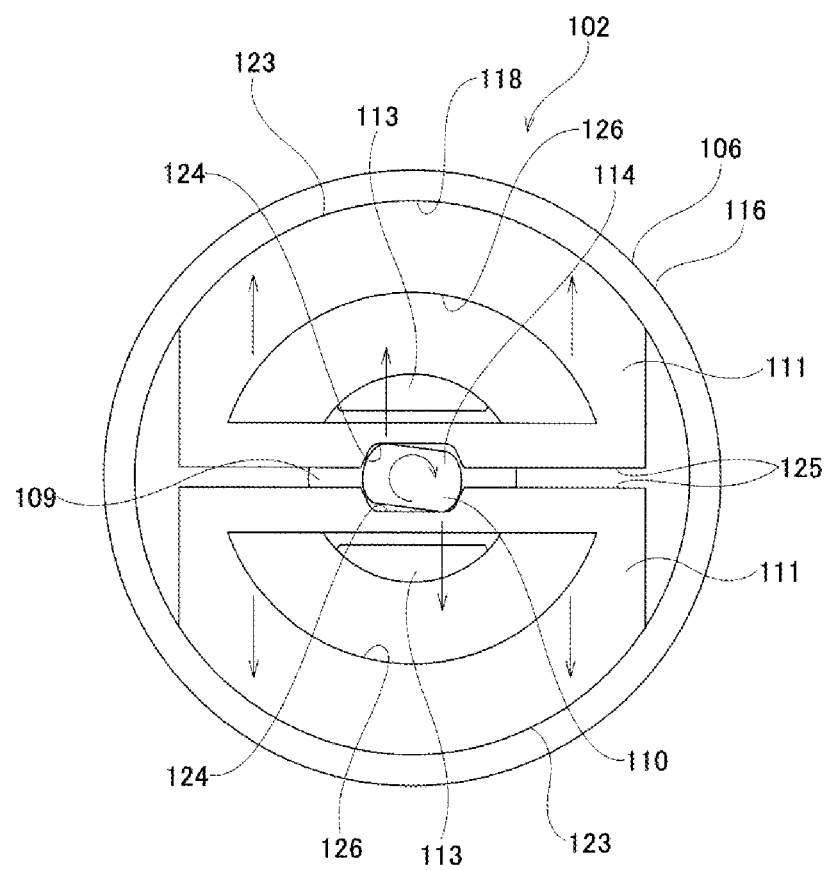
FIG. 23 is a cross sectional view of section B-B in FIG. 21, illustrating the conventional reverse-input blocking clutch in a state where rotational torque is reversely input to the output member.

A third example of an embodiment of the present invention will be described using FIG. 20.

In the reverse-input blocking clutch 1b of this example, the housing 4a is configured by coupling an input-side housing element 16a having a mounting portion 64a and an output-side housing element 17a having a pressed surface 24a with coupling bolts 18. That is, in this example, the input-side housing element 16a configures the second pressed member element and the output-side housing element 17a configures the first pressed member element.

The input-side housing element 16a includes a tubular portion 63a having a cylindrical shape, an input-side small diameter tubular portion 20 having a cylindrical shape, a side plate portion 21a having a hollow circular plate shape, and a plurality of mounting portions 64a.

The tubular portion 63a has an input-side in-row fitting surface 25a configuring the outer-diameter-side fitting surface around the inner peripheral surface thereof.

The input-side small diameter tubular portion 20 is arranged on the one side in the axial direction of the tubular portion 63a so as to be coaxial with the tubular portion 63a.

The side plate portion 21a has a hollow circular plate-shaped end surface shape when viewed from the axial direction. An end portion on the outside in the radial direction of the side plate portion 29a is connected to an end portion on the one side in the axial direction of the tubular portion 63a, and an end portion on the inside in the radial direction of the side plate portion 21a is connected to an end portion on the other side in the axial direction of the input-side small-diameter tubular portion 20. The side plate portion 21a has through holes 23a penetrate in the axial direction at a plurality of locations in the circumferential direction of a portion on the outside in the radial direction.

The mounting portions 64a are provided at a plurality of locations that are evenly spaced in the circumferential direction. Each of the mounting portions 64a has a protruding portion 65a protruding from the outer peripheral surface of the tubular portion 63a toward the outside in the radial direction and a mounting hole 32a that penetrates in the axial direction of the protruding portion 65a.

The output-side housing element 17a has an output-side large-diameter tubular portion 68 having a cylindrical shape, an output-side small-diameter tubular portion 28 having a cylindrical shape, and a side plate portion 29 having a hollow circular plate shape.

The output-side large-diameter tubular portion 68 has a pressed surface 24a on the inner peripheral surface in an intermediate portion in the axial direction. The pressed surface 24a is configured by a cylindrical surface centered on the center axis of the output-side housing element 17.

The output-side large-diameter tubular portion 68 has an output-side in-row fitting surface 30a, which configures an inner-diameter-side fitting surface, on the outer peripheral surface at an end portion on the one side in the axial direction. The output-side in-row fitting surface 30a is configured by a cylindrical surface centered on the center axis of the output-side housing element 17a, and has an outer-diameter dimension that allows the output-side in-row fitting surface 30a to be fitted to the input-side in-row fitting surface 25a without looseness.

The output-side large-diameter tubular portion 68 has screw holes 31a opening at an end surface on the one side in the axial direction at a plurality of locations in the circumferential direction that are aligned with the through holes 23a of the input-side housing element 16a.

The housing 4a is configured by coupling and fixing the input-side housing element 16a and the output-side housing element 17a together by fitting the input-side in-row fitting surface 25a of the input-side housing element 16a with the output-side in-row fitting surface 30a of the output-side housing element 17a without looseness, and screwing the coupling bolts 18 that are inserted through the through holes 23a into the screw holes 31a and further tightening them in a state where the end surface on the one side in the axial direction of the output-side large-diameter tubular portion 68 of the output-side housing element 17a is in contact with a portion on the outside in the radial direction of the side surface on the other side in the axial direction of the side plate portion 21a of the input-side housing element 16a.

In this example, the input-side housing element 16a is supported by and fixed to the fixed member 62 by screwing the supporting bolts inserted through the mounting holes 32a into the screw holes 66 provided in the fixed member 62 and further tightening them. As a result, the housing 4a is supported by and fixed to the fixed member 62.

In the reverse-input blocking clutch 1b of this example, the input-side housing element 16a having the mounting portions 64a fixed to the fixed member 62 and the output-side housing element 17a having the pressed surface 24a are configured separately. Due to this, it is possible to prevent the output-side housing element 17a from being deformed with supporting and fixing the housing 4a to the fixed member 62. As a result, it is possible to prevent deterioration of the roundness of the pressed surface 24a provided on the inner peripheral surface of the output-side large-diameter tubular portion 68 of the output-side housing element 17a.

Further, the input-side in-row fitting surface 25a provided on the inner peripheral surface of the tubular portion 63a of the input-side housing element 16a and the output-side in-row fitting surface 30a provided on the outer peripheral surface of the output-side large-diameter tubular portion 68 of the output-side housing element 17a are fitted without looseness. As a result, even if the pressed surface 24a is pressed toward outside in the radial direction by the pressing surfaces 39 of the engaging elements 5b as a result of the reverse input of the rotational torque to the output member 3, it is possible to prevent the pressed surface 24a from being deformed toward the outside in the radial direction.

In this example, each of the engaging elements 5b has a pressing surface 39, and includes a pair of body plates 36a that are arranged separately in the axial direction and one link member 37a that is oscillatably supported between the pair of body plate 36a. However, as the engaging element, it is also possible to employ an engaging element having a construction in which a pair of link members is oscillatably supported on both sides in the axial direction of one body pate having a pressing surface, such as the engaging element 5 of the first example, or an engaging element that is configured by only one body plate, such as the engaging element 5a of the second example. Other configurations and operational effects are the same as in the first example and the second example.

The present invention may be adopted not only to a reverse-input blocking clutch that switches between an unlocked state and a locked state or a semi-locked state by moving an engaging element in the radial direction as described in the first example to the third example, but also to a reverse-input blocking clutch that switches between an unlocked state and a locked state or a semi-locked state by moving an engaging element in the circumferential direction as in the construction described in WO2006/117343 and the construction described in JP2007-040343A.

REFERENCE SIGNS LIST 1,1a,1b Reverse-input blocking clutch
2,2a Input member
3 Output member
4,4a Housing
5,5a Engaging element
6,6a Input-side engaging portion
7 Shaft member
8 Input-side engaging pin
9 Input shaft portion
10 Input arm portion
11 Support holes
12 Output-shaft portion
13 Output-side engaging portion
14 Side surface
15 Guide surface
16,16a Input-side housing element
17,17a Output-side housing element
18 Coupling bolt
19 Input-side large diameter tubular portion
20 Input-side small diameter tubular portion
21,21a Side plate portion
22 Flange portion
23,23a Through hole 24,24a Pressed surface
25,25a Input-side in-row fitting surface
26 Input-side bearing fitting surface
28 Output-side small-diameter tubular portion
29 Side plate portion
30,30a Output-side in-row fitting surface
31 Screw hole
32,32a Mounting hole
33 Output-side bearing fitting surface
34 Input-side bearing
35 Output-side bearing
36,36a Body plate
37 Link member
38 Oscillation-support shaft
39 Pressing surface
40 Output-side engaged portion
41 Oscillation-support portion
42 Bottom surface
43 Guided surface
44 Insertion hole
45 First convex portion
46 Second convex portion
47,47a Input-side engaged portion
48 Oscillation-supported portion
49 Long hole
50 Elastic member
51 Support plate portion
52 Pressing plate portion
53 Connecting plate portion
54 First through hole
55 Second through hole
56 Reinforcing member
57 Insertion hole
58 Support hole
59 Elastic pressing portion
60 Base plate portion
61 Flat surface
62 Fixed member
63,63a Tubular portion
64,64a Mounting portion
65,65a Protruding portion
66 Screw hole
67 Reinforcing rib
68 Output-side large-diameter tubular portion
100 Electric motor with the reverse-input blocking clutch
101 Output shaft
102 Reverse-input blocking clutch
103 First shaft
104 Second shaft
105 Motor housing
106 Rotor
107 Stator
108 Clutch housing
109 Input portion
110 Output portion
111 Engaging element
112 Input shaft portion
113 Input-side engaging portion
114 Output-side engaging portion
115 Small-diameter cylindrical portion
116 Large-diameter cylindrical portion
117 Side plate portion
118 Pressed surface
119 Protruding portions
120 Screw hole
121 Protrusion
122 Through hole
123 Pressing surface
124 Output-side engaged portion
125 Bottom surface
126 Input-side engaged portion

The invention claimed is:

1. A reverse-input blocking clutch, comprising:
a pressed member including a first pressed member element having a pressed surface around an inner peripheral surface thereof and an inner-diameter-side fitting surface on an outer peripheral surface thereof, and a second pressed member element having a mounting portion fixed to a portion that does not rotate during use and an outer-diameter-side fitting surface externally fitted to the inner-diameter-side fitting surface without looseness with regard to a radial direction on an inner peripheral surface thereof,
an input member rotatably supported with respect to one of the first pressed member element or the second pressed member element,
an output member coaxially arranged with the input member and rotatably supported with respect to the other of the first pressed member element or the second pressed member element, and
an engaging element configured to transmit rotational torque input to the input member to the output member when the rotational torque is input to the input member by moving in a direction away from the pressed surface based on engagement with the input member and engaging with the output member, and to completely block rotational torque reversely input to the output member or transmit a part of the rotational torque reversely input to the output member to the input member and block a remaining part thereof when the rotational torque is reversely input to the output member by moving in a direction toward the pressed surface based on engagement with the output member to come into contact with the pressed surface.

2. The reverse-input blocking clutch according to claim 1, wherein
the second pressed member element includes a tubular portion having the outer-diameter-side fitting surface on an inner peripheral surface thereof, and
the mounting portion has a protruding portion protruding from the tubular portion toward an outside in the radial direction and a mounting hole penetrating the protruding portion in an axial direction through which a bolt is inserted.

3. The reverse-input blocking clutch according to claim 1, wherein
the input member is rotatably supported with respect to the second pressed member element, and the output member is rotatably supported with respect to the first pressed member element.

4. The reverse-input blocking clutch according to claim 1, wherein
the input member is rotatably supported with respect to the first pressed member element, and the output member is rotatably supported with respect to the second pressed member element.

5. The reverse-input blocking clutch according to claim 1, wherein
the input member has an input-side engaging portion in a portion deviated in the radial direction from a center of rotation of the input member,
the output member has an output-side engaging portion on an inner side in the radial direction from the input-side engaging portions, and the engaging element has a pressing surface on an outside surface in the radial direction facing the pressed surface, an output-side engaged portion on an inside surface in the radial direction that engages with the output-side engaging portion, and an input-side engaged portion in an intermediate portion in the radial direction that engages with the input-side engaging portion.

6. The reverse-input blocking clutch according to claim 5, wherein an elastic member elastically held between the output-side engaging portion and the engaging element is provided, and the elastic member presses the output-side engaging portion toward a side farther from the pressed surface in a first direction as a direction of the pressing surface moving away from or toward the pressed surface, and presses the engaging element toward a side closer to the pressed surface in the first direction.

7. The reverse-input blocking clutch according to claim 5, wherein the engaging element is configured by a pair of engaging elements arranged so as to hold the output-side engaging portion from both sides in the radial direction, and the input-side engaging portion is configured by a pair of input-side engaging portions.

8. The reverse-input blocking clutch according to claim 7, wherein a reinforcing member spanning between tip end portions of the pair of input-side engaging portions is provided.

* * * * *